United States Patent
Seo et al.

(10) Patent No.: US 10,567,567 B2
(45) Date of Patent: Feb. 18, 2020

(54) ELECTRONIC DEVICE AND METHOD FOR CONTROLLING OF THE SAME

(71) Applicant: LG ELECTRONICS INC., Seoul (KR)

(72) Inventors: Kyunghye Seo, Seoul (KR); Juhyun Jung, Seoul (KR); Younghoon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/100,996

(22) Filed: Aug. 10, 2018

(65) Prior Publication Data

US 2019/0075200 A1 Mar. 7, 2019

(30) Foreign Application Priority Data

Aug. 10, 2017 (KR) .................. 10-2017-0101861

(51) Int. Cl.
| | | |
|---|---|---|
| *H04M 1/725* | (2006.01) | |
| *G06F 9/451* | (2018.01) | |
| *G06F 1/3203* | (2019.01) | |
| *G06F 1/16* | (2006.01) | |

(52) U.S. Cl.
CPC ...... *H04M 1/72563* (2013.01); *G06F 1/1684* (2013.01); *G06F 1/3203* (2013.01); *G06F 9/451* (2018.02)

(58) Field of Classification Search
CPC ...... G06F 9/451; G06F 1/1684; G06F 1/3203; G06F 1/1626; G06F 1/1671; G06F 1/169; G06F 1/1694; G06F 1/1698; G06F 1/266; G06F 2203/0338; G06F 2203/0339; G06F 3/04847; G06F 3/04883; G06F 3/04886; G06F 9/452; H04M 1/72563; H04M 1/72533; H04M 1/72583; H04M 2201/34; H04M 2250/12; H04M 2250/22; H04M 2250/52; H04N 21/4126; H04N 21/42202; H04N 21/42207; H04N 21/42208; H04N 21/42224; H04N 21/42226
USPC ........................................ 455/420
See application file for complete search history.

(56) References Cited

U.S. PATENT DOCUMENTS

| | | | | |
|---|---|---|---|---|
| 10,306,331 | B2* | 5/2019 | Westbrook | ........... H04N 5/76 |
| 2009/0002217 | A1* | 1/2009 | Kryze | ........... G08C 17/02 341/176 |
| 2009/0102800 | A1* | 4/2009 | Keenan | ........... G06F 3/017 345/173 |
| 2009/0195407 | A1* | 8/2009 | Nakano | ........... H04N 5/4403 340/12.23 |
| 2010/0138680 | A1* | 6/2010 | Brisebois | ........... G06F 1/1626 713/324 |
| 2010/0311406 | A1* | 12/2010 | Lin | ........... H04M 11/007 455/420 |

(Continued)

*Primary Examiner* — Nathan S Taylor
(74) *Attorney, Agent, or Firm* — Lee Hong Degerman Kang & Waimey

(57) ABSTRACT

A mobile terminal and a method for controlling the mobile terminal are disclosed. A mobile terminal according to the present invention may figure out a user's intention for controlling an IoT device on the basis of at least one of a grip sensor, attitude detection sensor, camera image, and context awareness information without involving a process of executing a separate application for controlling the IoT device, thereby providing a control menu for controlling the IoT device more intuitively.

17 Claims, 26 Drawing Sheets

(56) References Cited

U.S. PATENT DOCUMENTS

| | | | | |
|---|---|---|---|---|
| 2012/0146918 | A1* | 6/2012 | Kreiner | H04M 1/7253 345/173 |
| 2014/0210708 | A1* | 7/2014 | Simmons | G06F 3/01 345/156 |
| 2014/0316581 | A1* | 10/2014 | Fadell | G05D 23/1904 700/276 |
| 2015/0015378 | A1* | 1/2015 | Aliakseyeu | G08C 17/00 340/12.5 |
| 2015/0046996 | A1* | 2/2015 | Slaby | H04L 63/08 726/7 |
| 2015/0193553 | A1* | 7/2015 | Petersen | G06F 16/9554 235/375 |
| 2015/0253351 | A1* | 9/2015 | Sadasivam | G06F 3/017 702/141 |
| 2016/0072638 | A1* | 3/2016 | Amer | H04L 12/2818 398/106 |
| 2016/0080679 | A1* | 3/2016 | Arling | G08C 17/02 348/734 |
| 2016/0094814 | A1* | 3/2016 | Gousev | G06K 9/6267 348/143 |
| 2016/0165192 | A1* | 6/2016 | Saatchi | H04N 5/772 386/227 |
| 2017/0083788 | A1* | 3/2017 | Chan | G06K 9/6201 |
| 2018/0084228 | A1* | 3/2018 | Pellom | G06K 9/00771 |
| 2018/0367656 | A1* | 12/2018 | Kim | H04M 1/67 |

\* cited by examiner

FIG. 9B
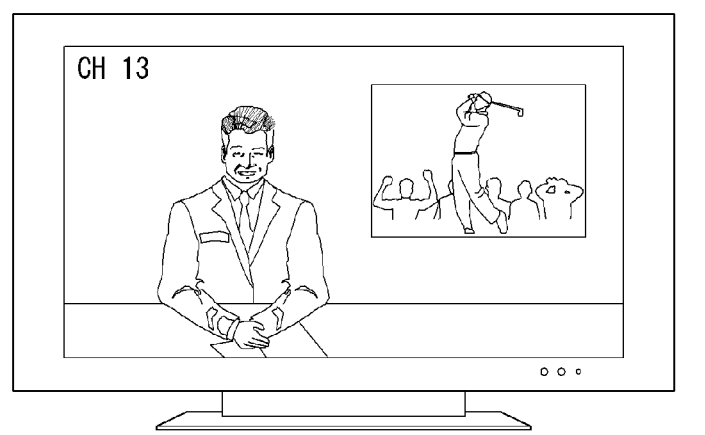
[Power-on state]
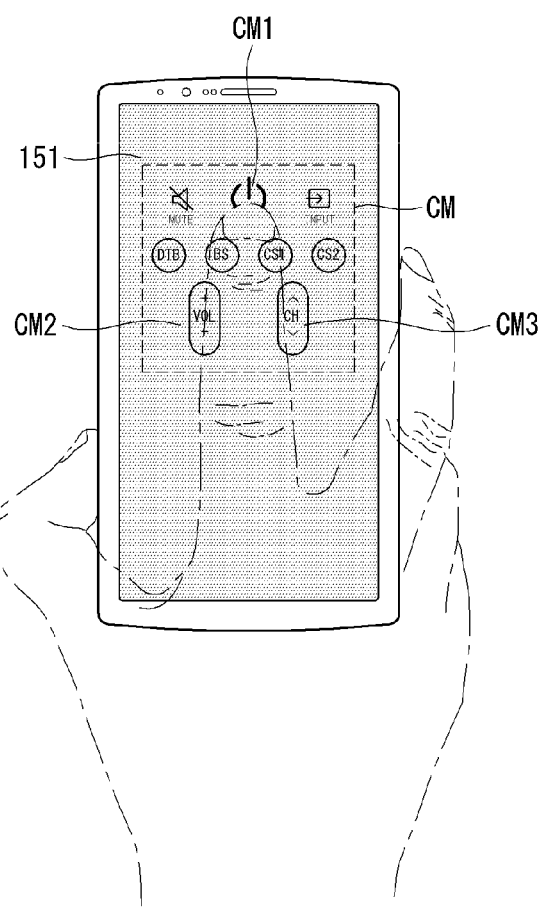

FIG. 10A
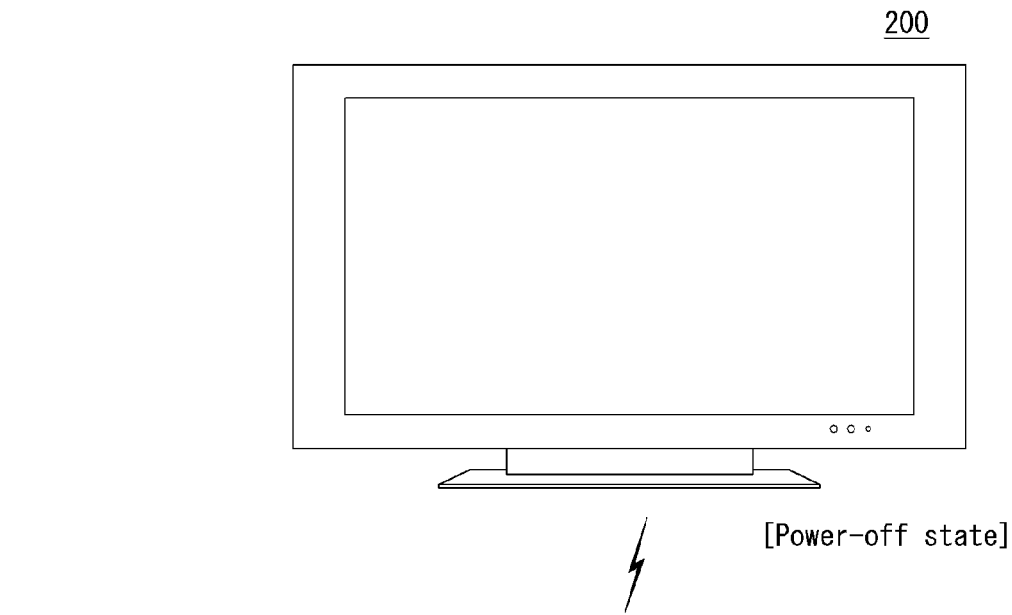
[Power-off state]
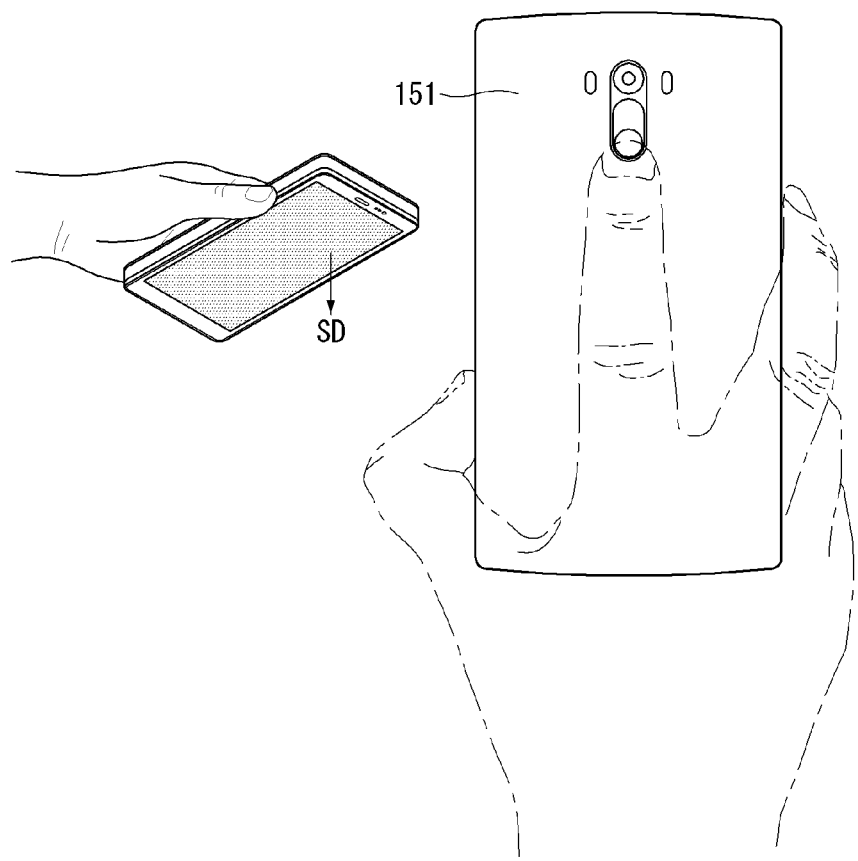

FIG. 10B
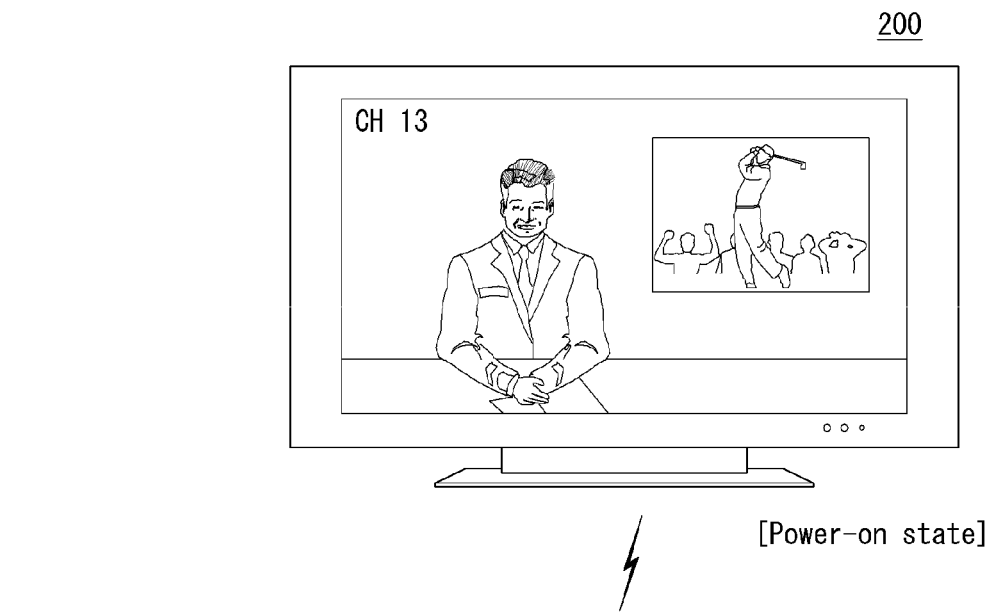
[Power-on state]
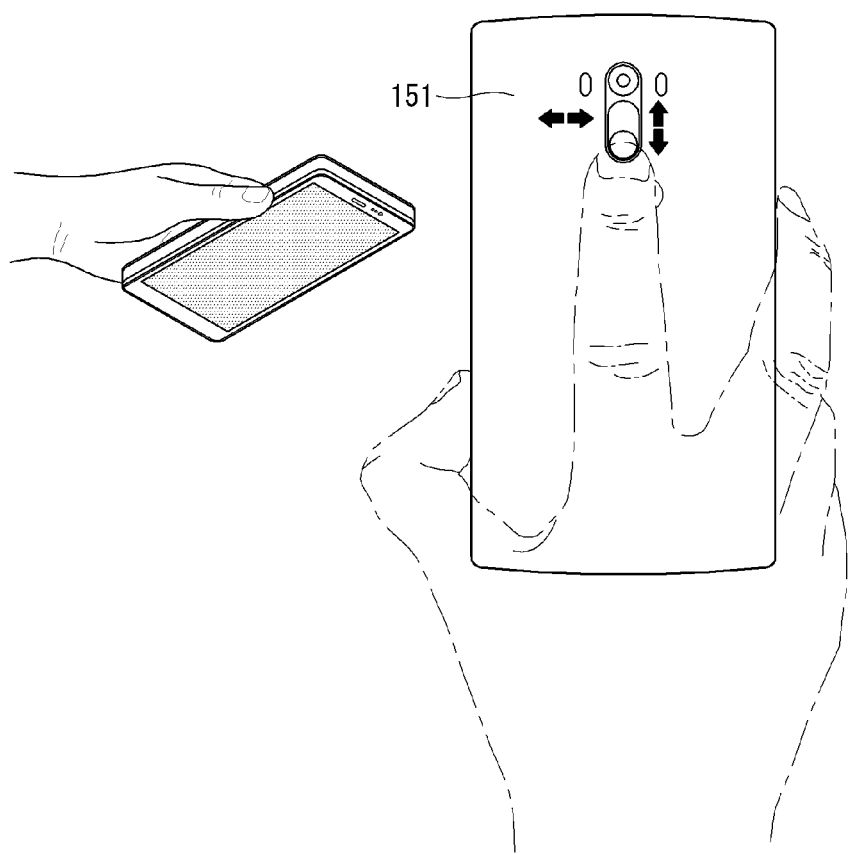

ELECTRONIC DEVICE AND METHOD FOR CONTROLLING OF THE SAME

CROSS-REFERENCE TO RELATED APPLICATIONS

Pursuant to 35 U.S.C. § 119(a), this application claims the benefit of earlier filing date and right of priority to Korean Patent Application No. 10-2017-0101861, filed on Aug. 10, 2017, the contents of which are hereby incorporated by reference in its entirety.

BACKGROUND OF THE INVENTION

Field of the Invention

The present invention relates to a mobile terminal and a method for controlling the mobile terminal. More specifically, the present invention relates to a mobile terminal for controlling IoT devices and a method for controlling the mobile terminal.

Related Art

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, the Internet is evolving from a human-centric connection network in which people generate and consume information to the Internet of Things (IoT) network in which distributed objects exchange and process information. The Internet of Everything (IoE) technology is one example of combining the IoT technology with a big data processing technology through a connection to a cloud server.

To implement the IoT, various technical elements such as sensing technology, wired/wireless communication and network infrastructure, service interface technology, and security technology are required. To this end, technologies for connecting objects, such as sensor network and Machine-to-Machine (M2M) communication, and Machine Type Communication (MTC), are recently being researched.

The IoT environment may provide an intelligent Internet Technology (IT) service which collects and analyzes data generated by connected objects and creates a new value to the human life. IoT may be applied to various fields such as smart home, smart building, smart city, smart car or connected car, smart grid, health care, smart appliances, and advanced medical services, through fusion of the existing IT and various industrial technologies.

As described above, as functions of a mobile terminal are becoming more diversified, needs for a technology capable of controlling IoT devices more conveniently though a mobile terminal by using functions thereof in conjunction with various IoT devices.

As an example of controlling IoT devices by using a mobile terminal, techniques for controlling an IoT device by using infrared (IR) sensors installed in the mobile terminal are under development. However, the aforementioned techniques require separate hardware and have to run separate application programs for controlling an IoT device, which may cause inconvenience for a user. For example, a user of a mobile terminal has to go through a tedious procedure of executing a separate application program, registering an IoT device, and so on, to control the IoT device.

Accordingly, when the speed of pinch zoom (out) input of a user is not steadily maintained, zoom-processing of images is actually not performed uniformly, either.

Moreover, even if a user receives a pinch zoom (out) input with respect to a desired zoom point while shooting a video, an image is zoom-processed actually with respect to the central point of a screen independently of the zoom point desired by the user.

SUMMARY OF THE INVENTION

Accordingly, an object of the present invention is to address the above-noted and other problems.

An object of the present invention is to provide a mobile terminal providing a user interface by which a user can control the mobile terminal easily and efficiently and a method of controlling the same.

Also, an object of the present invention is to provide a mobile terminal capable of controlling an IoT device more intuitively by figuring out the user's intention for controlling the IoT device through at least one sensor installed in the mobile terminal and a method for controlling the mobile terminal.

Also, an object of the present invention is to provide a mobile terminal capable of entering a remote control mode for controlling an IoT device just by the user's gripping the mobile terminal and capable of managing the IoT device more intuitively by disposing various control menus at proper positions according to the grip state of the user.

A mobile terminal according to one aspect of the present invention includes a body; a touch screen being installed at the front surface of the body and receiving a touch input; a grip sensor being installed along the edge of the body and sensing a grip; an attitude detection sensor detecting attitude of the body; a rear surface input unit being installed on the rear surface of the body and receiving a control command; a wireless communication unit performing wireless communication with an external electronic device; and a controller, when at least one sensing signal coming from the grip sensor or the attitude detection sensor indicates that at least one of a grip state or attitude of the body satisfies a predetermined condition, controlling the mobile terminal to enter a remote control mode for controlling the external electronic device remotely and controlling the external electronic device through an input detection signal in the remote control mode.

The grip state satisfying the predetermined condition includes sensing gripping more than a predetermined region of the lower edge among the grip sensor installed along the edge of the body, gripping more than a predetermined region of a first side surface edge, and gripping more than a predetermined region of a second side surface edge, wherein, when a touch input applied to an arbitrary point of the touch screen is held for more than a predetermined period of time while the grip state is maintained, the controller may control the mobile terminal to enter the remote control mode.

The grip state satisfying the predetermined condition includes sensing gripping more than a predetermined region of the lower edge among the grip sensor installed along the edge of the body, gripping more than a predetermined region of a first side surface edge, and gripping more than a predetermined region of a second side surface edge, wherein, when an input through the rear surface input unit is held for more than a predetermined period of time while the grip state is maintained, the controller may control the mobile terminal to enter the remote control mode.

When the controller detects a change of the attitude of the body through the attitude detection sensor and the changed attitude is maintained for a predetermined period of time, the controller may control the mobile terminal to operate in the remote control mode.

When the mobile terminal enters the remote control mode, the controller may display, on the touch screen, a control menu for controlling the external electronic device remotely on the basis of the position of a touch input applied to the touch screen.

When the mobile terminal enters the remote control mode, the controller may detect the power supply state of the external electronic device, configure the control menu differently according to the power supply state, and display the control menu on the touch screen.

When the controller detects that power has not been supplied to the external electronic device, the controller may display a power button at the touch position while, when the controller detects that power has been supplied to the external electronic device, the controller may display, on the touch screen, at least one control menu including the power button.

When the mobile terminal enters the remote control mode, the controller may consider an input signal through the rear surface input unit as a control signal for controlling the external electronic device remotely.

When the mobile terminal enters the remote control mode, the controller may detect the power supply state of the external electronic device and apply a different control function to an input signal through the rear surface input unit depending on the power supply state.

The mobile terminal may further include a camera, and the controller may recognize the external electronic device through the camera in the Always on Camera (AOC) mode in which the camera is operated while the touch screen is in an inactive state.

The controller may obtain context awareness information and control a specific external electronic device corresponding to the obtained context awareness information in the remote control mode.

The controller may obtain the context awareness information through at least one sensor sensing information of an indoor environment in which the mobile terminal is located, wherein the at least one sensor may include at least one of a temperate sensor, humidity sensor, light sensor, image sensor, or air quality measurement sensor.

The context awareness information may include a history of remote control of the external electronic device by using the mobile terminal in the remote control mode.

When the mobile terminal enters the remote control mode while an execution screen of a specific application is being displayed on the touch screen, the controller may display a control menu for controlling the external electronic device on the touch screen in the form of a pop-up window.

The external electronic device may include at least one of a refrigerator, washing machine, TV, air conditioner, air purifier, humidifier, dehumidifier, drier, robot vacuum cleaner, speaker, or car.

When the mobile terminal enters the remote control mode from the Always on Display (AOC) mode in which the touch screen is in an inactive state, the controller may provide a control menu for controlling the external electronic device on the touch screen in the inactive state.

A method for controlling a mobile terminal according to another aspect of the present invention, to control at least one external electronic device connected through a predetermined network, includes detecting a grip state of the mobile terminal or an attitude of the mobile terminal; when at least one of the grip state and the attitude satisfies a predetermined condition, entering a remote control mode for controlling the external electronic device remotely through a wireless communication unit; and controlling the external electronic device through an input signal detected in the remote control mode.

A mobile terminal according to the present invention and a method for controlling the mobile terminal provide the following advantageous effects.

According to the present invention, a user's intention to control an IoT device is determined through at least one sensor installed at a mobile terminal, and thereby the IoT device may be controlled more intuitively.

Also, according to the present invention, a remote control mode for controlling an IoT device may be entered just by the user's gripping the mobile terminal, various control menus may be disposed at proper positions according to the grip state of the user, and thereby IoT devices may be managed more intuitively.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

With the mobile terminal and the method of controlling the same according to the present invention, the following effects are obtained.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 9A to 9B illustrate an example of providing a control menu by taking into account the state of an IoT device in the embodiment of FIG. 8.

FIG. 10A to 10B illustrates an example in which types of input signals applied to a rear surface input unit are varied according to the state of an IoT device in the embodiment of FIG. 8.

DESCRIPTION OF EXEMPLARY EMBODIMENTS

Figure 1A:
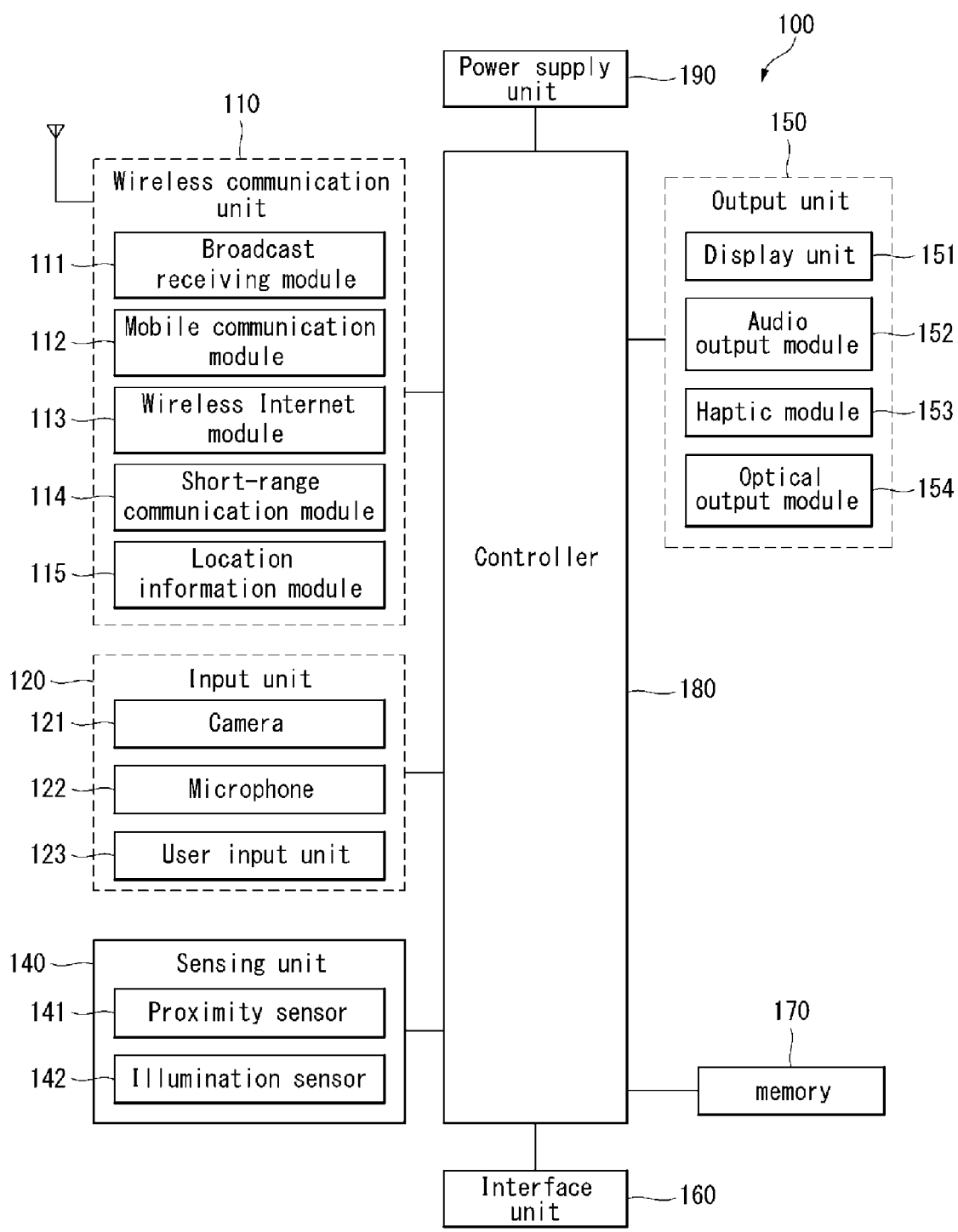
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as proximity sensor(141), illumination sensor(142), a touch sensor, an acceleration sensor(144), a magnetic sensor, a G-sensor, a gyroscope sensor(143), a motion sensor, an RGB sensor, an infrared (IR) sensor, a force sensor(145), a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
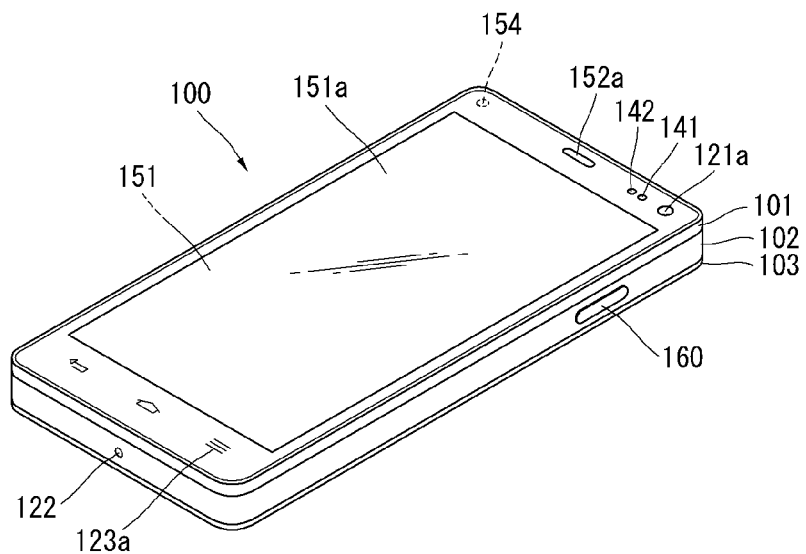
FIGS. 1B and 1C are conceptual views of one example of the mobile terminal, viewed from different directions.
Figure 1C:
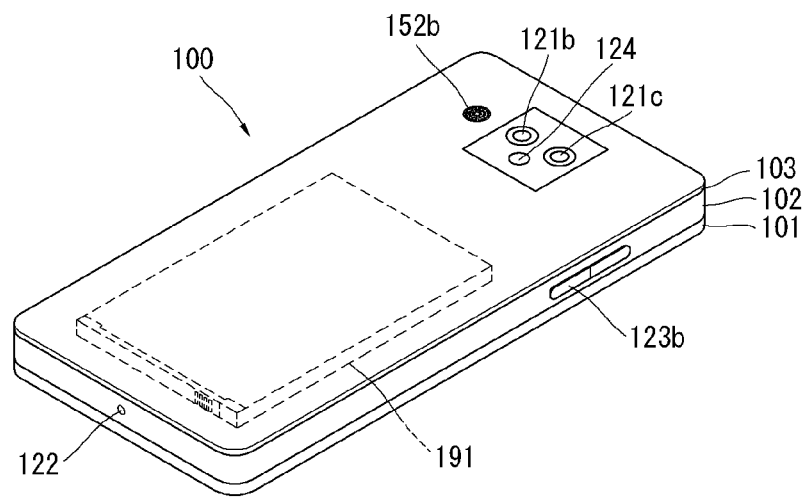

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal includes a display unit 151, a first and a second audio output modules 151*a*/151*b*, a proximity sensor 141, an illumination sensor 142, an optical output module 154, a first and a second cameras 121*a*/121*b*, a first and a second manipulation units 123*a*/123*b*, a microphone 122, interface unit 160 and the like.

It will be described for the mobile terminal as shown in FIGS. 1B and 1C. The display unit 151, the first audio output module 151*a*, the proximity sensor 141, an illumination sensor 142, the optical output module 154, the first camera 121*a* and the first manipulation unit 123*a* are arranged in front surface of the terminal body, the second manipulation unit 123*b*, the microphone 122 and interface unit 160 are arranged in side surface of the terminal body, and the second audio output modules 151*b* and the second camera 121*b* are arranged in rear surface of the terminal body.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
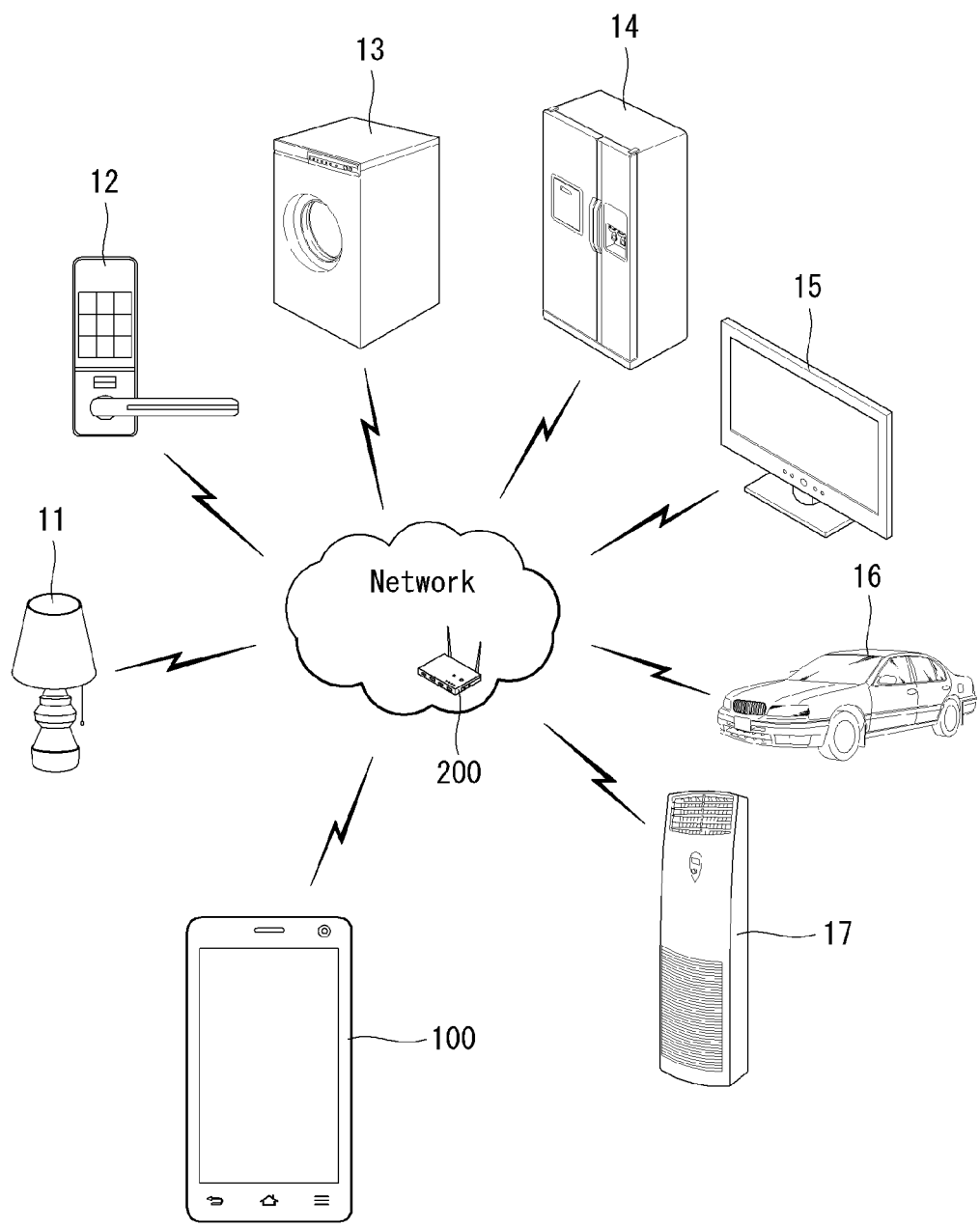
FIG. 2 illustrates a plurality of external electronic devices constituting an IoT environment and a mobile terminal for controlling the devices according to one embodiment of the present invention.

FIG. 2 illustrates a plurality of external electronic devices constituting an IoT environment and a mobile terminal for controlling the devices according to one embodiment of the present invention.

Referring to FIG. 2, an IoT environment according to one embodiment of the present invention may include a plurality of external electronic devices 11-7, a mobile terminal 100 for controlling the plurality of external electronic devices 11-17, and a network connecting the plurality of external electronic devices 11-17 and the mobile terminal 100. The network may further include an Access Point (AP) 10 for relaying the plurality of external electronic devices 11-17 to the mobile terminal 100.

The mobile terminal 100 may transmit or receive data to or from the plurality of external electronic devices 11-17 according to various communication specifications. For example, specifications for infrared communication, RF communication, Near Field Communication (NFC), Zigbee, Digital Living Network Alliance (DLNA), and so on may be applied. Similarly, data may be transmitted or received according as the mobile terminal is connected to a wired/wireless network including the Internet.

Also, the mobile terminal 100 according to one embodiment of the present invention may control a plurality of external electronic devices 11-17 and transmit control signals for controlling individual devices to the plurality of external electronic devices 11-17. More specifically, the mobile terminal 100 may transmit control signals directly to the plurality of external electronic devices 11-17 or transmit control signals to the plurality of devices 11-17 through a relay 200. Also, when one device among the plurality of devices satisfies a specific condition, the mobile terminal 100 may transmit a control signal which commands to transmit another control signal for controlling other device.

Meanwhile, the plurality of external electronic devices 11-17 are only an example, which include a light stand 11, door lock 12, washing machine 13, refrigerator 14, TV 15, car 16, and air conditioner 17.

Meanwhile, the mobile terminal 100 may correspond to a device equipped with a function or an application capable of controlling the plurality of external electronic devices 11-17, and various embodiments of the mobile terminal described above may be applied to the device.

Figure 3:
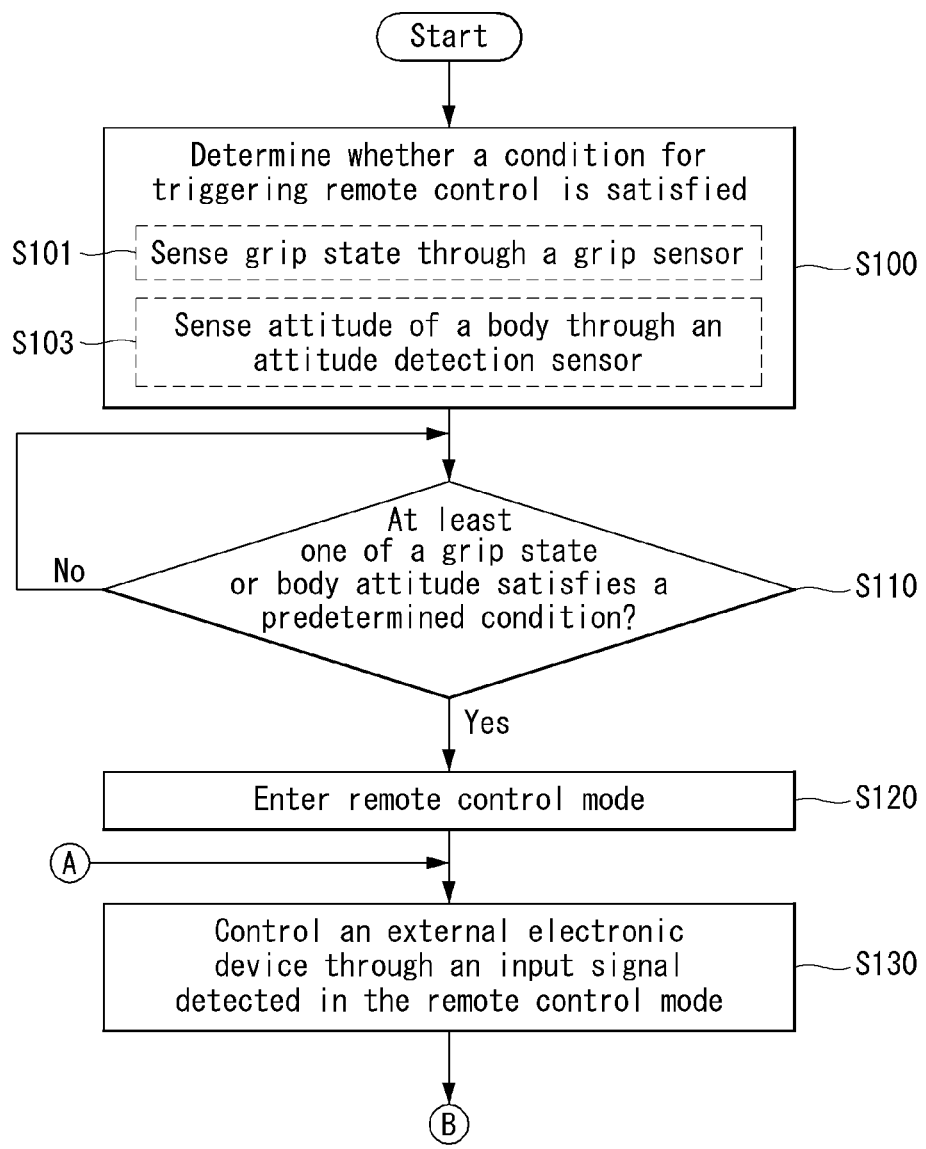
FIG. 3 is a flow diagram of a method for a mobile terminal according to one embodiment of the present invention.

FIG. 3 is a flow diagram of a method for a mobile terminal according to one embodiment of the present invention.

A method for controlling a mobile terminal according to one embodiment of the present invention may be implemented in the mobile terminal described with reference to FIGS. 1a to 2. In what follows, with reference to related drawings, a method for controlling a mobile terminal according to one embodiment of the present invention and the operation of the mobile terminal 100 to implement the method will be described in detail.

One embodiment of the present invention is related to control an IoT device more intuitively when the mobile terminal 100 satisfies a condition for triggering remote control for controlling the IoT device. In other words, first, a process S100 of determining whether the mobile terminal 100 satisfies a condition for triggering remote control is employed.

More specifically, the controller 180 may determine the remote control triggering condition through a sensing unit installed in the mobile terminal 100. The sensing unit may include a grip sensor and an attitude detection sensor.

The controller 180 may determine the grip state of the user through the grip sensor, namely how the user currently grips the mobile terminal 100, S101. At this time, the grip state may refer to a state in which the user's body part makes contact to the grip sensor installed in the terminal body (which will be described in detail with reference to FIGS. 5a and 5b).

The controller 180 may sense the attitude of the mobile terminal body through an attitude detection sensor S103. The attitude of the body may refer to an orientation of a specific constituting element of the mobile terminal body. For example, the attitude may refer to an orientation of the display unit 151. Also, the attitude of the body may indicate a change in the attitude of the body. In other words, by sensing a difference between the directions of the display unit 151 before and after the attitude of the body is changed, the attitude change of the mobile terminal 100 may be detected.

Meanwhile, according to one embodiment of the present invention, provided that the grip state detected through the grip sensor and the attitude of the mobile terminal 100 detected through the attitude detection sensor are maintained for a predetermined period of time, the sensing result may be considered to be meaningful. In other words, when a detected grip state or a detected attitude of the mobile terminal is maintained for a predetermined period of time, the controller 180 may determine whether the remote control triggering condition is satisfied or not.

The controller 180 may determine whether at least one of the grip state or the attitude of the mobile terminal satisfies a predetermined condition S110.

When the grip state or the attitude of the mobile terminal satisfies a predetermined condition S110: YES, the controller 180 may control the mobile terminal to enter the remote control mode S120.

The controller 180 may control an external electronic device through an input signal detected in the remote control mode S130.

In what follows, with reference to FIGS. 4 to 6b, in which condition a mobile terminal 100 enters the remote control mode will be described in more detail.

Figure 4:
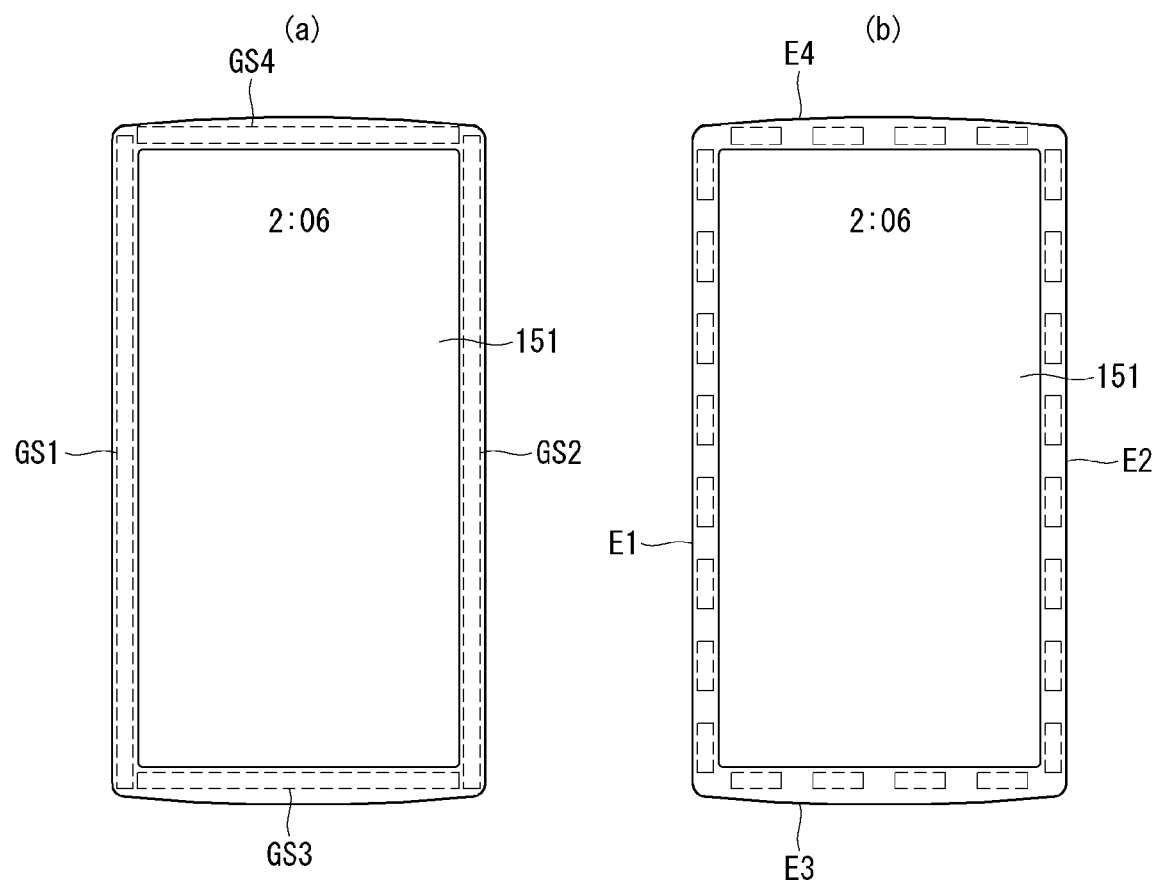
FIG. 4 illustrates an example of a grip sensor installed in a mobile terminal according to one embodiment of the present invention.

FIG. 4 illustrates an example of a grip sensor installed in a mobile terminal according to one embodiment of the present invention.

Referring to FIG. 4, a mobile terminal 100 includes a body and a touch screen 151 installed on the front surface of the body and receiving a touch input. And along the edge of the body, grip sensors may be disposed. For example, the body is constructed with four side surfaces, and four grip sensors GS1, GS2, GS3, GS4 may be disposed on each of the side surfaces (see FIG. 4(a)). Similarly, a plurality of grip sensors GS may be disposed on each of the four side surfaces at regular spacing (see FIG. 4(b)).

Figure 5A:
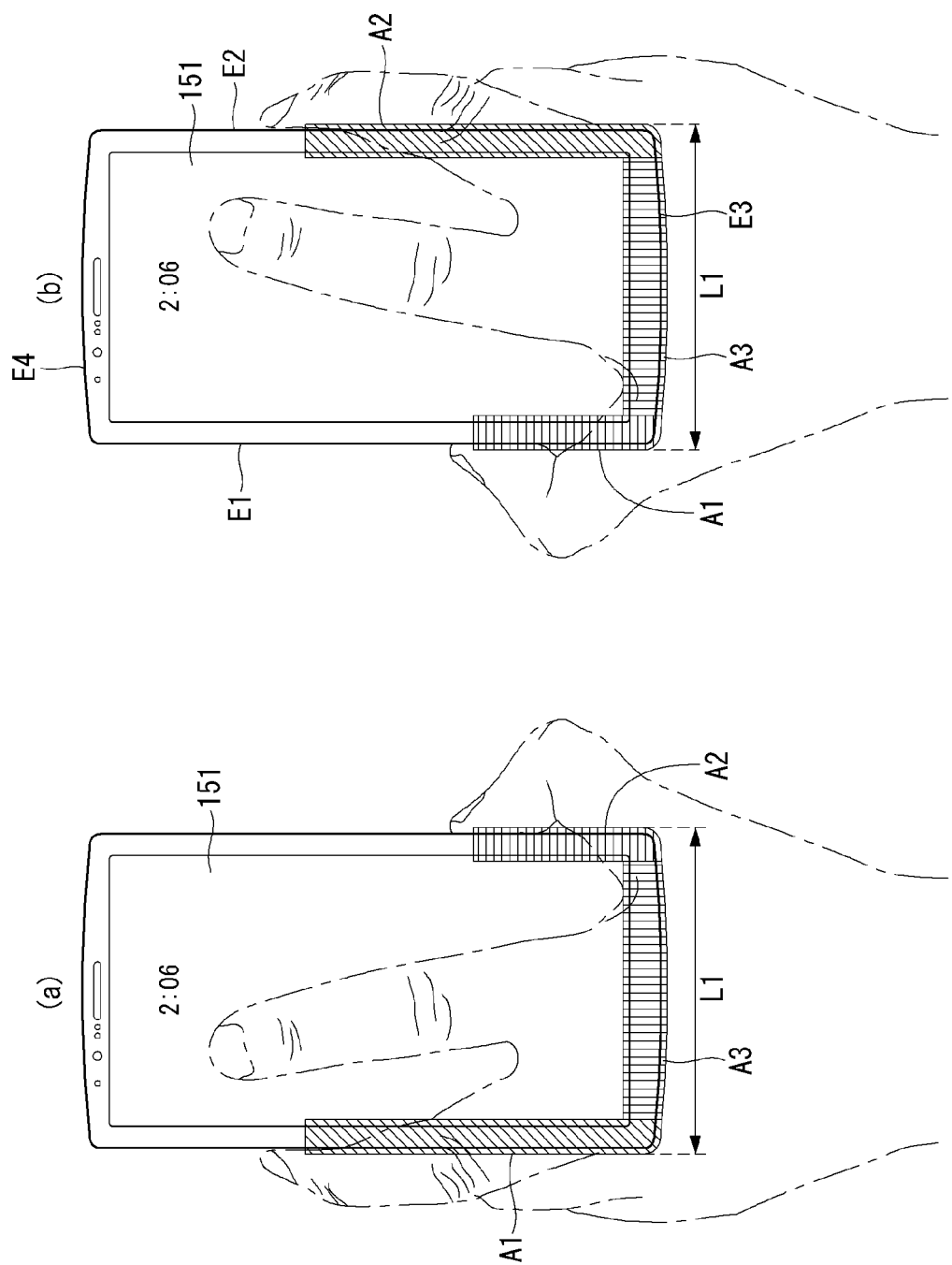
FIG. 5A to 5B illustrates grip types satisfying a condition for triggering remote control according to one embodiment of the present invention.
Figure 5B:
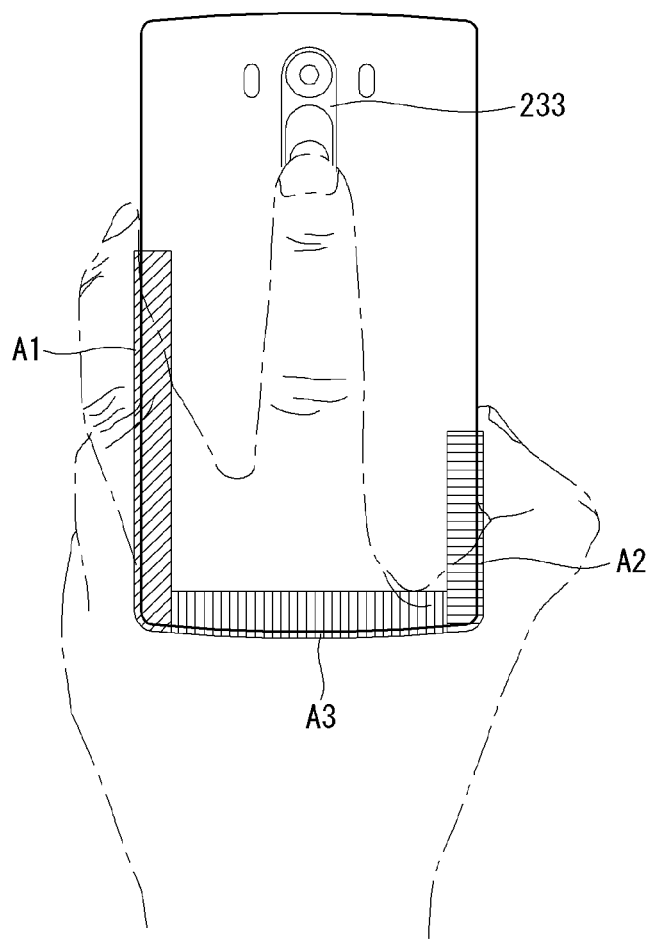

FIG. 5A to 5B illustrates grip types satisfying a condition for triggering remote control according to one embodiment of the present invention.

Referring to FIG. 5A, when the user grips the mobile terminal 100 with his or her left hand, the controller 180 detects that at least part of each grip sensor GS1, GS2 installed on a first side surface E1 and a second side surface E2 makes contact with the user's fingers. For example, when the user grips the mobile terminal 100 with his or her left hand, the controller 180 may detect that the first grip sensor GS1 makes contact to the user's left hand over a first area A1, the second grip sensor GS2 makes contact over a second area A2, and a third side surface E3 makes contact to the body part of the user by more than 90% of the whole area of the third side surface. At this time, the first area A1 is larger than the second area A2. Therefore, when the user grips the mobile terminal with the user's left hand, the controller 180 may detect that the grip type forms an asymmetric shape of '⊏' according as the A1, A2, and A3 area make contact with the user's body part at each side surface of the body. Here, the asymmetric shape of '⊏' may refer to a case in which the right A3 area is shorter than the left A1 area as shown in FIG. 5a.

When detecting that a touch input is maintained more than a predetermined period of time at an arbitrary position of the touch screen 151, the controller 180 may determine that the grip state has satisfied a condition for the mobile terminal to enter the remote control mode.

In the same manner, when the user grips the mobile terminal 100 with his or her right hand, similar to the case of FIG. 5A, the grip type may form an asymmetric shape of '⊐'. In other words, the longitudinal length of the contact area A1 to the first side surface E1 and that of the contact area A2 to the second side surface E2 are shorter than the lengths of the respective side surfaces; and the third side surface E3 makes contact to the user's body part by more than 90% of the whole area of the third side surface. In other words, it may be known that most of the area of the lower part of the body makes contact to the user's palm.

In the same way, when detecting that a touch input is maintained more than a predetermined period of time at an arbitrary position of the touch screen 151, the controller 180 may determine that the grip state has satisfied a condition for the mobile terminal to enter the remote control mode.

In other words, when the grip state of the mobile terminal by the user's hand is maintained to show a predetermined pattern and a touch input at one point of the touch screen is maintained for a predetermined period of time, the controller 180 controls the mobile terminal 100 to enter the remote control mode.

Meanwhile, in the case of FIG. 5B, the grip state of the user's hand is the same as described above; however, whether to enter the remote control mode is determined through a combination of inputs with respect to the rear surface input unit 233 installed on the rear surface of the body.

Referring to FIG. 5B, when the user grips the mobile terminal 100; the contact area A1 through a first edge, a contact area A2 through a second edge, and a contact area A3 through a lower edge form an asymmetric shape of '⊏'; and an input through the rear surface input unit 233 is maintained for more than a predetermined period of time (for example, 3 seconds) together with the grip state, the controller 180 may determine that the mobile terminal enters the remote control mode.

In other words, in the case of FIG. 5B, depending on the grip type, the display unit 151 may be oriented to face the ground.

Both cases of FIGS. 5A and 5B may be similar to a situation in which a user holds a predetermined remote controller and makes a gesture to control an electronic device remotely.

Meanwhile, although FIG. 5A to 5B assume an asymmetric shape of '⊏' as a grip type for the mobile terminal 100 to enter the remote control mode, the present invention is not limited to the specific assumption. For example, even when a touch input to the touch screen or an input to the rear surface input unit is maintained for a predetermined period of time while the grip type forms a symmetric shape of '⊏', the mobile terminal may enter the remote control mode for controlling an IoT device.

It should be noted that the aforementioned grip type has been introduced for an illustrative purpose, not for a restrictive purpose.

Meanwhile, according to one embodiment of the present invention, separately from the grip type involving the grip sensors, whether a condition for triggering remote control is satisfied may be determined by detecting the attitude of the mobile terminal by using an attitude detection sensor.

Figure 6A:
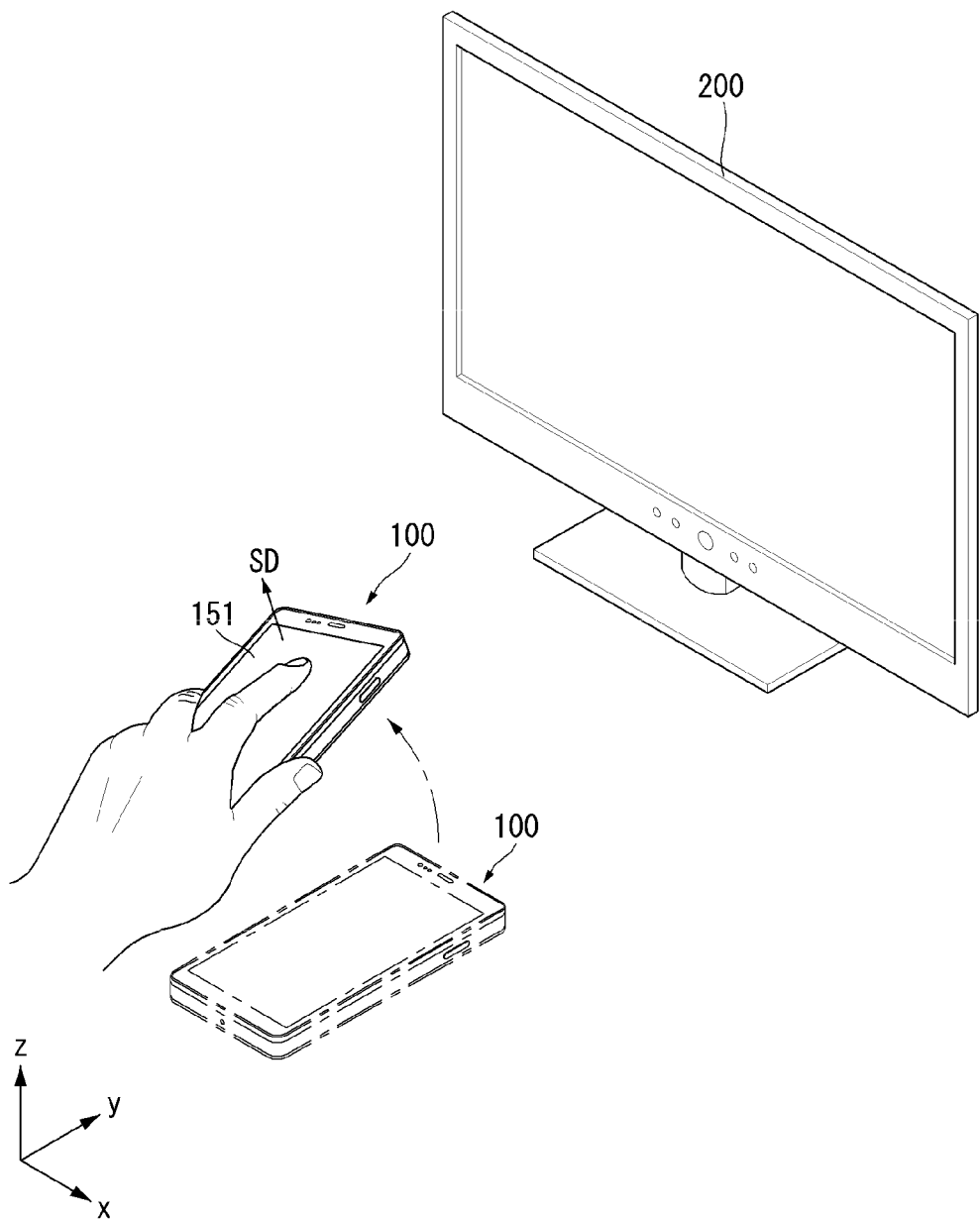
FIG. 6A to 6B illustrate an attitude change of a mobile terminal satisfying a condition for triggering remote control according to one embodiment of the present invention.
Figure 6B:
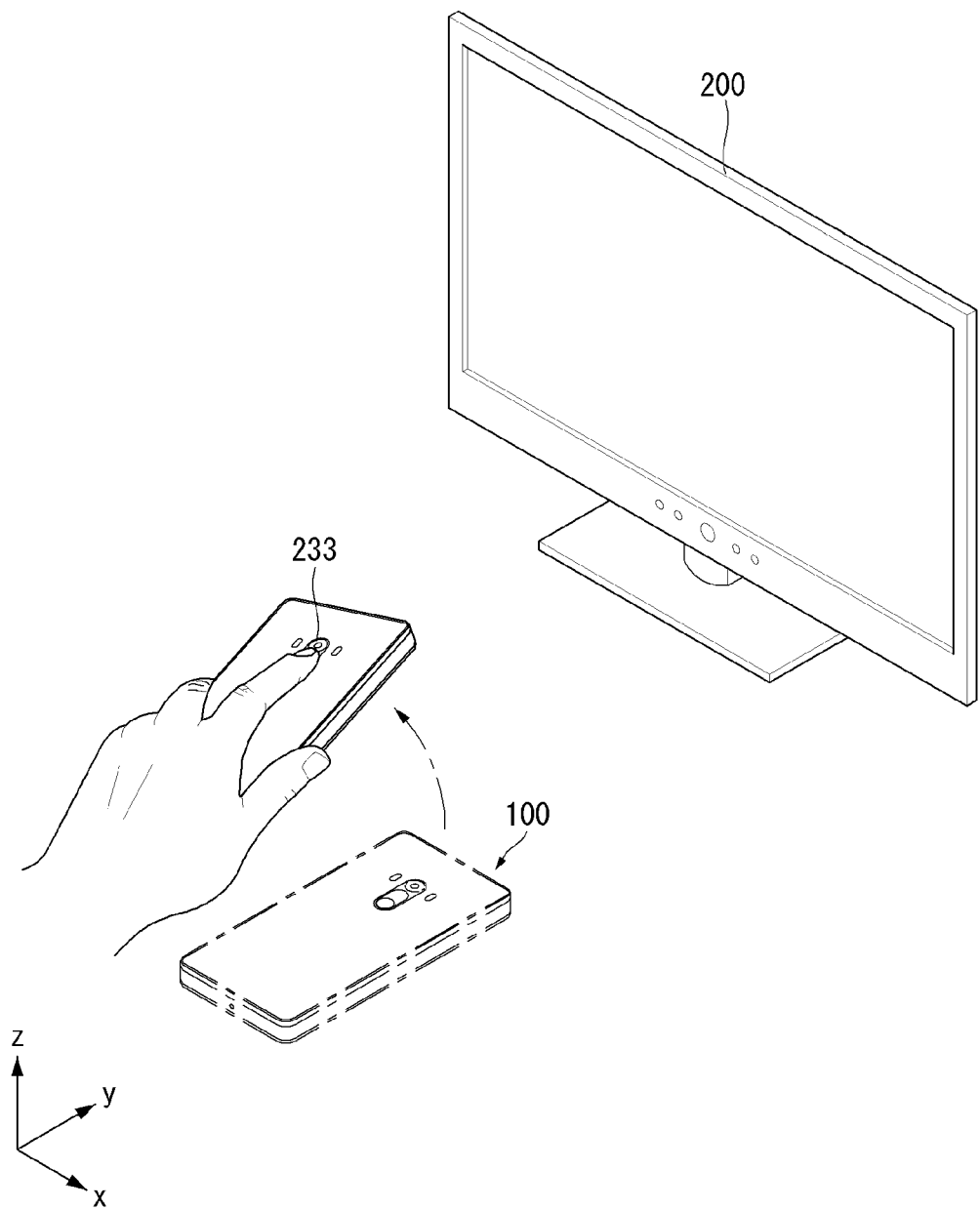

FIG. 6A to 6B illustrate an attitude change of a mobile terminal satisfying a condition for triggering remote control according to one embodiment of the present invention.

Referring to FIG. 6A, while a mobile terminal 100 lies flat on the ground, an attitude detection sensor may detect the mobile terminal forming a specific angle against the ground (for example, 20 to 60 degrees). The attitude detection sensor may detect the attitude change of the mobile terminal from the change of a direction vector representing the orientation of the display unit 151.

When an attitude change of the mobile terminal is detected and the changed attitude is maintained for more than a predetermined period of time, the controller 180 may control the mobile terminal to enter the remote control mode. In this case, too, the aforementioned grip state and touch input state may be maintained.

Meanwhile, referring to FIG. 6B, while the display unit 151 lies facing the ground, the attitude detection sensor may detect an attitude change as the body of the mobile terminal 100 makes a specific angle (for example, 20 to 60 degrees) against the ground. When an attitude change of the mobile terminal is detected and the changed attitude is maintained for more than a predetermined period of time, the controller 180 may control the mobile terminal 100 to enter the remote control mode. In this case, too, the aforementioned grip type and input state with respect to the rear surface input unit may be maintained.

Meanwhile, the attitude detection sensor may be a gyro sensor. The gyro sensor may detect an attitude change of a mobile terminal from change of angular velocity generated as the display unit 151 the initial orientation (SD) of which is horizontal is inclined by a predetermined amount of angles at a constant angular speed.

In the present invention, when at least one of the grip state detected by a grip sensor of the mobile terminal 100 or attitude of the mobile terminal detected by an attitude detection sensor satisfies a predetermined condition, the mobile terminal may enter the remote control mode. Therefore, it may be known that if the grip state satisfies the aforementioned condition, the attitude of the mobile terminal satisfies the aforementioned attitude condition, or both of the grip state and the attitude of the mobile terminal satisfy the aforementioned conditions, the mobile terminal enters the remote control mode, respectively.

Meanwhile, according to one embodiment of the present invention, it should be noted that the condition in which the mobile terminal enters the remote control mode is not limited to the aforementioned examples but may be implemented through a combination of various conditions. For example, from an IoT device recognition result through a camera, at least one of information about whether a mobile terminal and an IoT device is connected to each other in a network or context awareness information may be combined with the aforementioned conditions to generate another condition for the mobile terminal 100 to enter the remote control mode. A case in which the mobile terminal enters the remote control mode through an additional combination with other conditions will be described in more detail with reference to FIGS. 11 to 14.

Meanwhile, according to one embodiment of the present invention, to control an IoT device, in addition to inherent conditions set for the mobile terminal 100, a remote control condition for the mobile terminal 100 may be changed through state information of the IoT device. Accordingly, when the mobile terminal 100 satisfies the conditions described above and enters the remote control mode, it is necessary to receive state information of an IoT device to be controlled.

Figure 7:
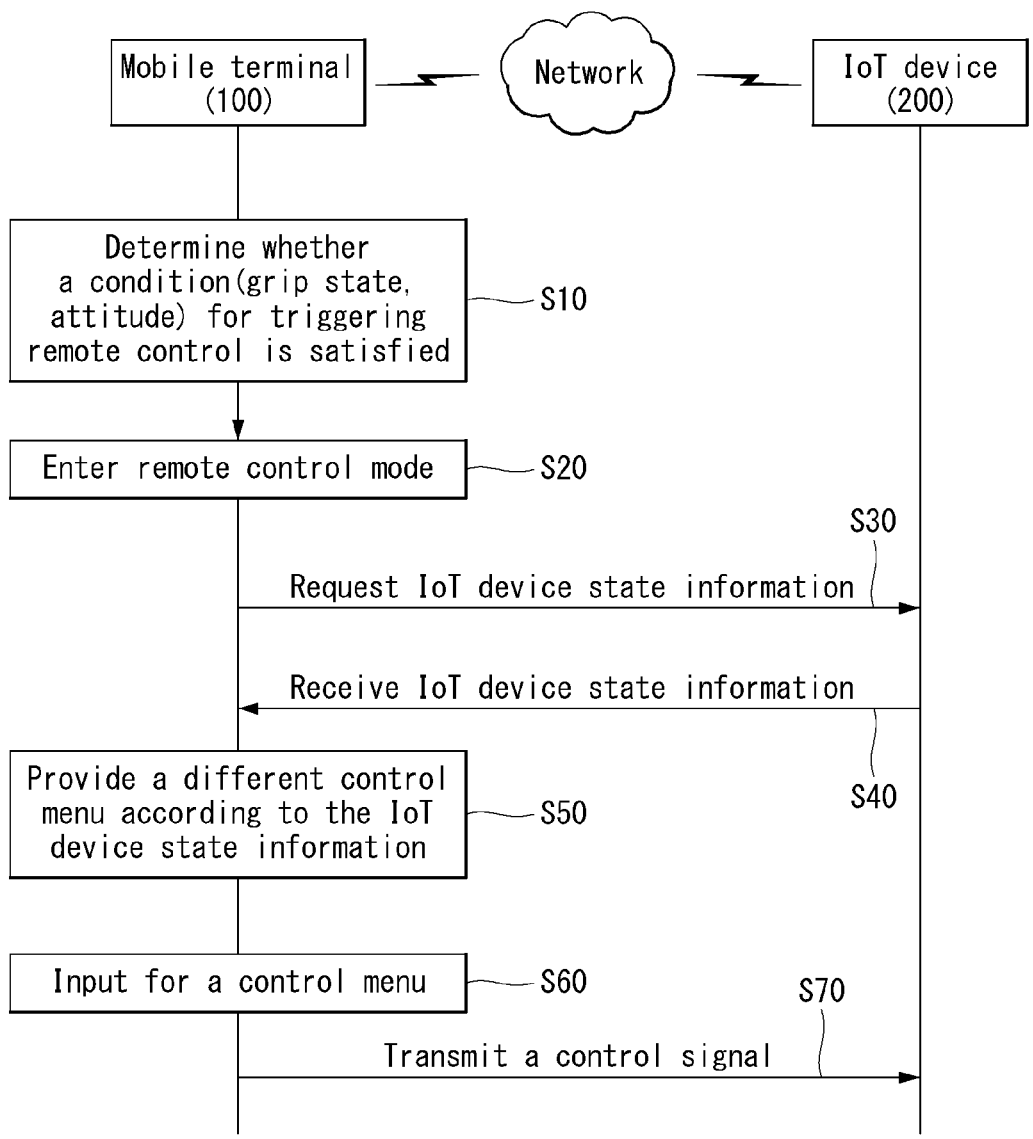
FIG. 7 illustrates a data flow between an IOD device and a mobile terminal in an IoT environment according to one embodiment of the present invention.

FIG. 7 illustrates a data flow between an IOD device and a mobile terminal in an IoT environment according to one embodiment of the present invention.

Referring to FIG. 7, the mobile terminal 100 may perform data communication with an IoT device 200 through a predetermined network.

The controller 180 may determine whether the mobile terminal 100 satisfies a remote control triggering condition S10. As described above, the mobile terminal 100 may enter the remote control mode as long as the remote control triggering condition is satisfied without involving a process of executing a separate application for controlling an IoT device S20.

When the mobile terminal enters the remote control mode, the controller 180 may transmit a signal requesting device state information from an IoT device 200 (a device to be controlled) connected to a predetermined network S30. Here, device state information may include whether the corresponding device is in a power-on or off state.

Receiving device state information from the IoT device 200, S40, the controller 180 may provide a different control menu selectively according to the state information of the IoT device 200, S50.

The controller 180 receives an input for the control menu provided S60. The input for the control menu may be an input for selecting a specific control menu among at least one control item. The controller 180 may transmit a control signal corresponding to the specific control menu to the IoT device 200.

So far, a flow for transmitting and receiving data to and from an IoT device while the mobile terminal 100 is not running a separate application for IoT device control has been described briefly. On the basis of the data transmission and reception flow, an interaction process for actually controlling an IoT device according to the grip state or attitude of the mobile terminal 100 will be described in detail with reference to related drawings.

Figure 8:
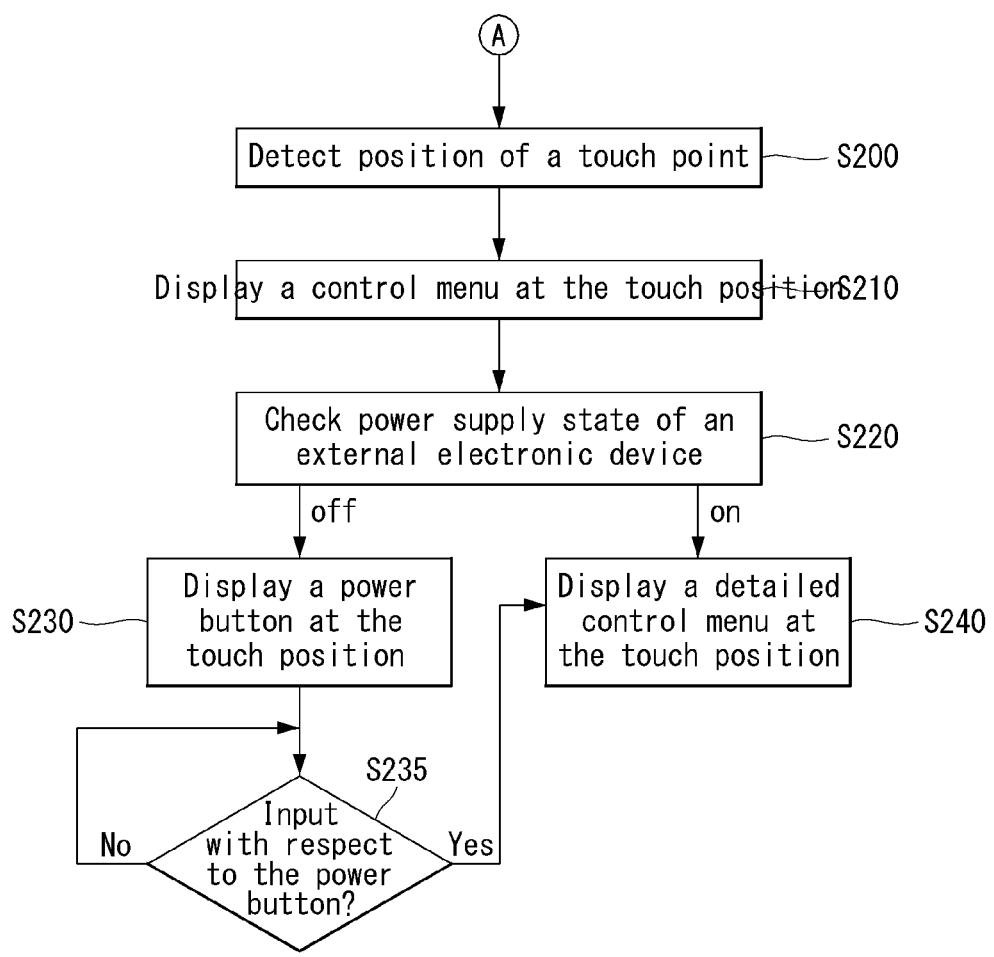
FIG. 8 illustrates a flow diagram of a method for controlling a mobile terminal according to one embodiment of the present invention.

FIG. 8 illustrates a flow diagram of a method for controlling a mobile terminal according to one embodiment of the present invention.

Referring to FIG. 8, as described with reference to FIG. 3, when at least one of a grip state with respect to the body of a mobile terminal 100 or attitude of the body satisfies a predetermined condition and the mobile terminal 100 enters the remote control mode (S120 of FIG. 3), the controller 180 may provide a user interface for controlling an IoT device to the display unit 151.

As described above, a grip state which satisfies the predetermined condition may include a grip type involving grip sensors and a touch input to the touch screen 151 at the same time.

The controller 180 may detect the position of the touch point S200. The controller 180 may calculate the coordinates of a touch point in the touch screen 151 while the grip state is maintained and display a predetermined control menu at the position corresponding to the touch point S210. Meanwhile, as described in FIG. 7, a different control menu may be provided according to the device state information of the IoT device 200 to be controlled.

The controller 180 may check power supply state of the IoT device (external electronic device 200) S220 and display a power button on the touch point S230 when the IoT device 200 is in the off-state. In other words, when a device to be controlled is in the off-state, the controller 180 may determine that the user's intention is to turn on the power of the IoT device in the remote control mode and position the power button at the touch point. The controller 180 may display only the power button at the touch point.

Meanwhile, when receiving an additional touch input with respect to the power button (S235: YES), the controller 180 may transmit, to the IoT device, a control signal controlling the IoT device to be turned on. Meanwhile, after transmitting the power-on control signal, the controller 180 may display, at the touch point, a detailed control menu by which other specific functions may be controlled in addition to power supply S240. In other words, the controller 180 may configure a control menu provided at a touch point differently according to the current state of a control object in the remote control mode.

Also, when the power button is displayed at the touch point while a touch input with respect to the touch point is continuously maintained, the controller 180 may transmit a control signal which automatically turns on the power of an IoT device without an additional touch input to the power button to the IoT device 200.

Meanwhile, if device state information of the IoT device 200 is checked while the mobile terminal is in the remote control mode and it is found that power has already been supplied to the IoT device 200 and the IoT device is kept in the on-state, the controller 180 may display a detailed control menu by which the entire functions of the IoT device 200 may be controlled at the position of the touch point S240.

Figure 9A:
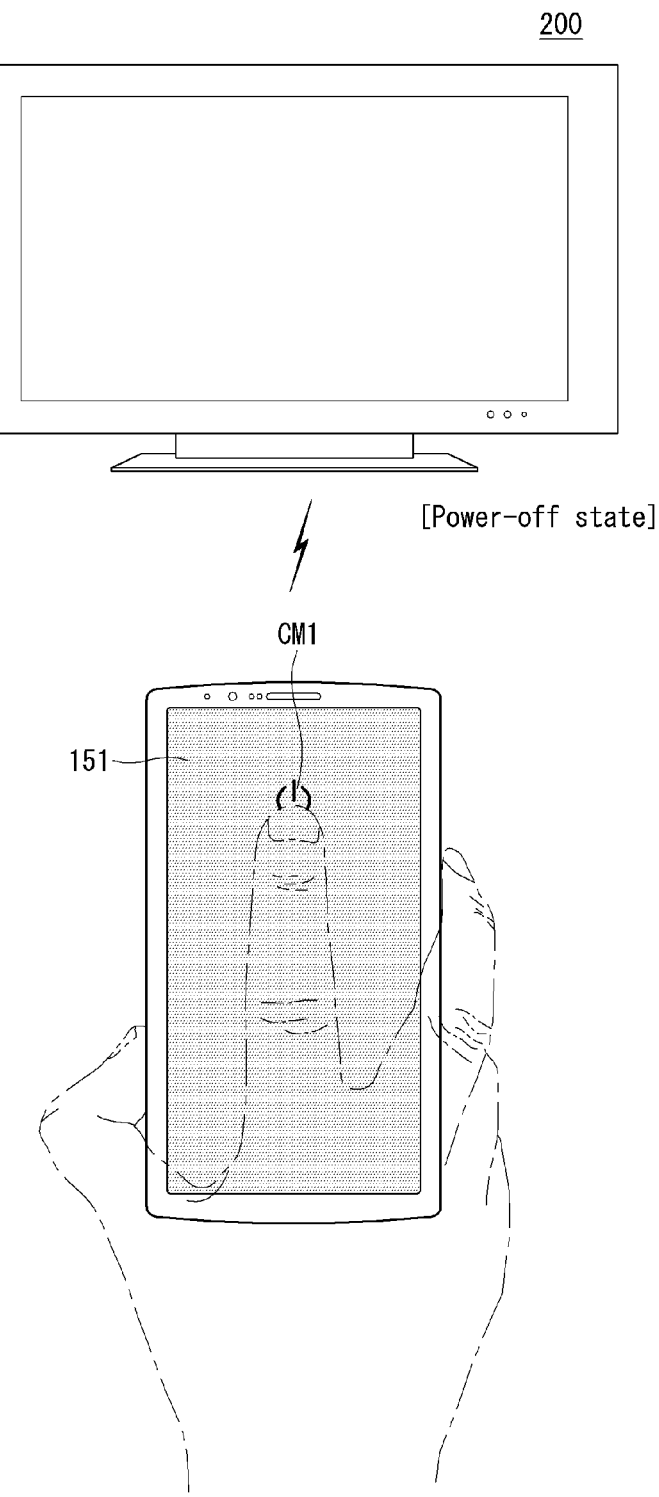

FIG. 9A to 9B illustrate an example of providing a control menu by taking into account the state of an IoT device in the embodiment of FIG. 8.

Referring to FIG. 9A, when a condition requiring that a predetermined grip state and a touch input be maintained is satisfied, the controller 180 checks the IoT device 200 for the device state. If the power of the IoT device 200 is found to be turned off, the controller 180 may provide a power button menu (CM1) at the position corresponding to the touch input without performing a separate application for controlling an IoT device.

Referring to FIG. 9B, although the same grip state and touch input are maintained in the embodiment of FIG. 9A, if the power of the IoT device 200 is determined to be in the on-state, a detailed control menu CM by which the whole functions of the IoT device 200 may be controlled is displayed around the touch point. For example, if an object to be controlled is a TV, the detailed control menu CM may include a power button CM1, volume control menu CM2, and channel switch menu CM3.

Meanwhile, the control menu may be provided while the touch screen 151 of the mobile terminal 100 is in the inactive state. The controller 180 may display predetermined information on the Always on Display (AOD) while the touch screen is in the inactive state. The controller 180 may display the control menu together with AOD information or may display only the control menu in the AOD state when the mobile terminal has entered the remote control mode. Accordingly, according to one embodiment of the present invention, when the user grips the mobile terminal 100 itself properly to satisfy a specific condition (which is determined that the user's intention is to control an IoT device) without turning on the display unit 151 of the mobile terminal 100 or running a specific application to control the IoT device, the IoT device may be controlled immediately.

Figure 9C:
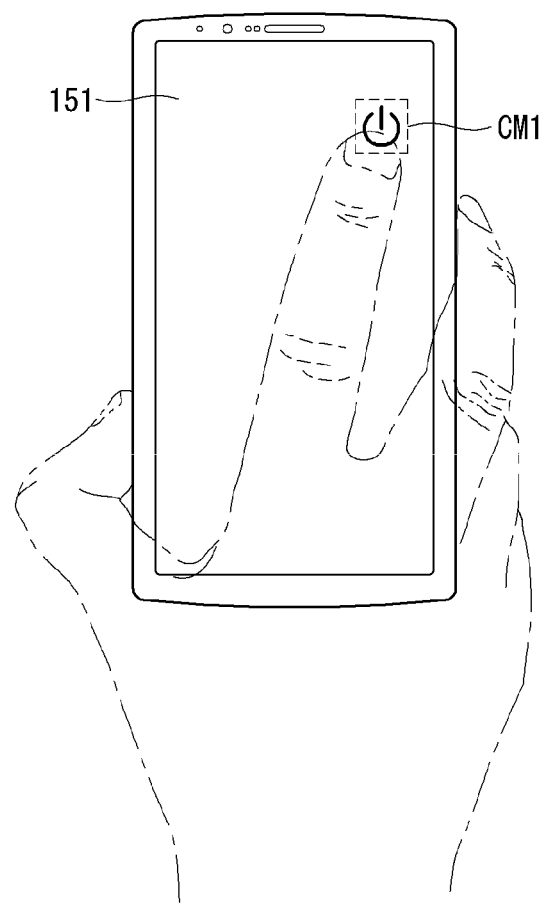
FIG. 9C illustrates an example of providing a control menu at the position of a touch input according to one embodiment of the present invention.

FIG. 9C illustrates an example of providing a control menu at the position of a touch input according to one embodiment of the present invention.

Referring to FIG. 9C, if the user grips the mobile terminal 100 at a specific moment to control an IoT device, the position of the user's finger making contact with the touch screen may change for each moment. According to one embodiment of the present invention, the controller 180 takes into account the position of the user's finger on the touch screen 151 and exposes a control menu CM1 at the corresponding position. Also, when the position of the user's finger changes while the control menu CM1 is displayed, the controller 180 may reflect the position change of the user's finger in real-time and move the displayed control menu CM1 according to the corresponding position of the user's finger.

FIG. 10A to 10B illustrates an example in which types of input signals applied to a rear surface input unit are varied according to the state of an IoT device in the embodiment of FIG. 8.

When the mobile terminal enters the remote control mode, the controller 180 may recognize an input signal through the rear surface input unit as a control signal controlling an IoT device remotely.

Referring to FIG. 10A, the controller 180 may detect the orientation of the front surface of the display unit 151 through an attitude detection sensor. The figure illustrates a case in which the user grips the body of a mobile terminal so that the front surface of the display unit 151 faces the ground and the user's finger makes contact to the rear surface of the input unit 233. When a grip state and an input to the rear surface input unit 233 lasts for more than a predetermined period of time, the controller 180 controls the mobile terminal to enter the remote control mode.

Afterwards, depending on whether power is supplied to the IoT device, the controller 180 configures the function of an input signal through the rear surface input unit differently. In other words, when an input signal through the rear surface input unit 233 is detected while the IoT device is turned off, the controller 180 may apply a function which turns on the power of the IoT device with respect to the input signal.

Also, referring to FIG. 10B, when the power of an IoT device is turned on, the controller controls the mobile terminal to perform different control functions according to an input pattern of the rear surface input unit 233. For example, although the rear surface input unit 233 may be provided in the form of a key input unit, the rear surface input unit may also be implemented in the form of a key pad. Therefore, when the power of the IoT device is turned on while the mobile terminal is in the remote control mode, the controller 180 may consider a scroll input (up-down direction or left-right direction) to the key pad installed at the rear surface input unit as a control signal for controlling the TV volume or channel change.

Figure 11:
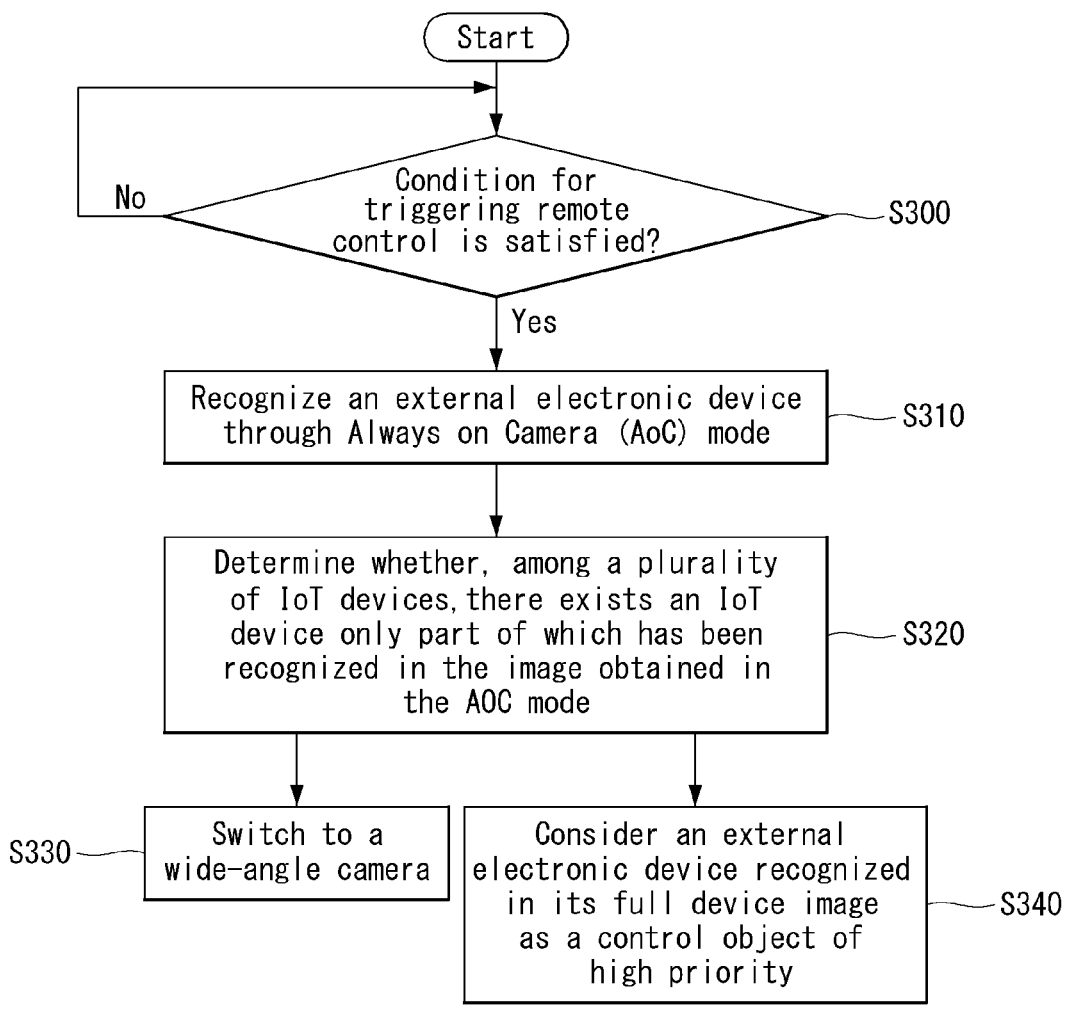
FIGS. 11 to 12 illustrate a method for controlling a mobile terminal which recognizes an IoT device through a camera according to one embodiment of the present invention.
Figure 12:
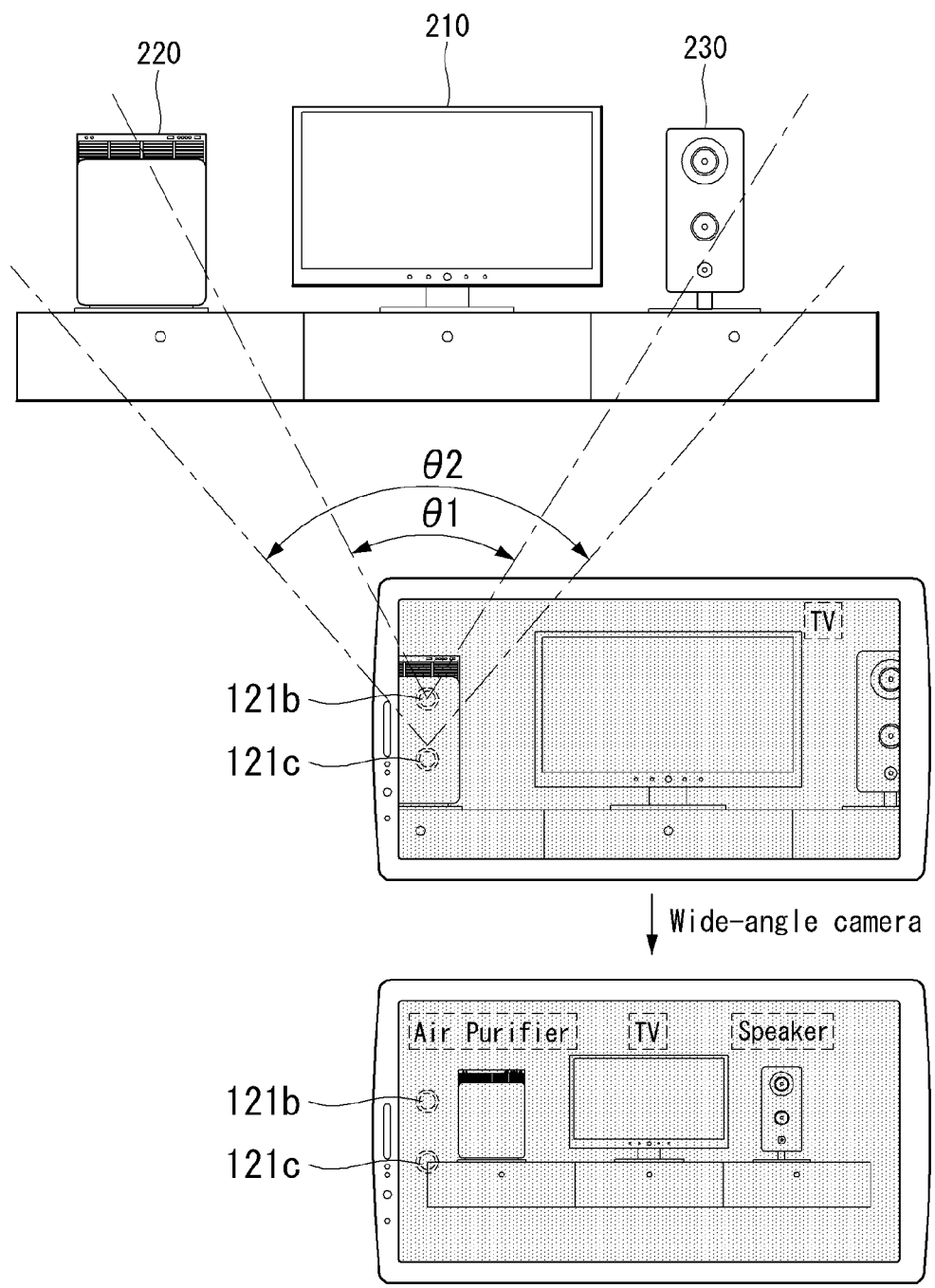

FIGS. 11 to 12 illustrate a method for controlling a mobile terminal which recognizes an IoT device through a camera according to one embodiment of the present invention.

Referring to FIG. 11, when the mobile terminal 100 satisfies a condition for triggering remote control S300: YES, the controller 180 may switch the mobile terminal 100 into a waiting state so that the mobile terminal 100 may operate as a device for controlling an IoT device.

It is necessary for the controller 180 to recognize an object to be controlled while the mobile terminal is in the waiting state. For example, the controller 180 needs to know which IoT device the mobile terminal 100 is to control in the remote control mode. When the mobile terminal 100 and an IoT device connect to the same local network and more particularly, when a plurality of IoT devices are connected to the same local network, it is necessary to select which IoT device to be recognized as a control object at the moment the mobile terminal 100 enter the remote control mode.

For example, the controller 180 may recognize an electronic device recognized through the camera as an object to be controlled. The controller 180 may recognize at least one external electronic device from the preview image obtained through the camera. The controller 180 may recognize the name of the at least one external electronic device and depending on the situation, display the name of the recognized external electronic device on the preview image. Meanwhile, the camera may be an Always on Camera which is operated when the touch screen 151 is in the inactive state. FIG. 11 illustrates an embodiment in which a device to be controlled is recognized through the camera.

When the mobile terminal 100 satisfies a remote control triggering condition S300: YES, the controller 180 may control the mobile terminal to recognize an IoT device through the AOC mode S310. The camera operating in the AOC mode may include a front camera 121a and rear camera 121b, 121c of the mobile terminal 100. For example, when the AOC mode is operated through the front camera 121a, the front surface of the mobile terminal 100 may be oriented to face the IoT device. Also, when the AOC mode is operated through the rear camera 121b, 121c, the front surface of the mobile terminal 100 may be oriented to face the user.

The controller 180 may determine whether, among a plurality of IoT devices, there exists an IoT device only part of which has been recognized in the image obtained in the AOC mode S320.

For example, a first rear camera 121b of the dual cameras installed on the rear surface is a normal camera while the second rear camera 121c may be a wide-angle camera. In the image obtained through the first rear camera 121b, due to the limited field of view, part of a plurality of IoT devices may not be recognized by their full device images. In this case, to recognize a device only part of which has been recognized in its full device image, the controller 180 may activate the wide-angle camera (the second rear camera 121c) S330 and thus recognize all of the IoT devices through wide-angle images without leaving any device being cut off.

Also, for example, when part of a plurality of IoT devices in an image captured through the camera is recognized by its partial device image, the controller 180 may consider those IoT devices recognized in their full device image as control objects of high priority S340.

Referring to FIG. 12, IoT devices (TV, air purifier, and speaker) disposed in the front may be recognized through the first rear camera 121b. Depending on the situation, the controller 180 may extract the name of an object to be controlled contained in the camera image (an obtained image may be transmitted to a home network server, and the object name may be obtained from the server or the object name may be extracted from an internal memory in which images and names of IoT devices are stored in pairs) and display the extracted name of the corresponding object being overlapped on a preview image.

In a first preview image I1 obtained through the first rear camera 121b having a first field of view $\theta 1$, the air purifier 220 and the speaker 230 are not captured in their full device image. In this case, the controller 180, instead of using the first rear camera 121b, may switch to the second rear camera 121c having a second field of view $\theta 2$. From a second preview image I2 obtained through the second rear camera 121c, the controller 180 recognizes the air purifier 200 and the speaker 230 in their full device image. The second field of view $\theta 2$ may be larger than the first field of view $\theta 1$, and the wide-angle camera may capture a front image with a field of view angle $\theta 2$ ranging from about 30° to 80°.

In the first preview image I1, only TV 210 is recognized as an IoT device in its full device image, and the controller 180 may recognize the TV 210 as an object to be controlled. Meanwhile, when the second preview image I2 is obtained, the controller 180 may recognize a device located at the center among a plurality of IoT devices as an object to be controlled.

So far, a method for controlling an IoT device more conveniently by taking into account a grip state and attitude state of a mobile terminal, state of the IoT device, image captured through a camera, and so on has been described. In what follows, a method for controlling an IoT device by utilizing context awareness information such as the surroundings of the mobile terminal 100 in addition to the grip state and the attitude state will be described.

Figure 13:
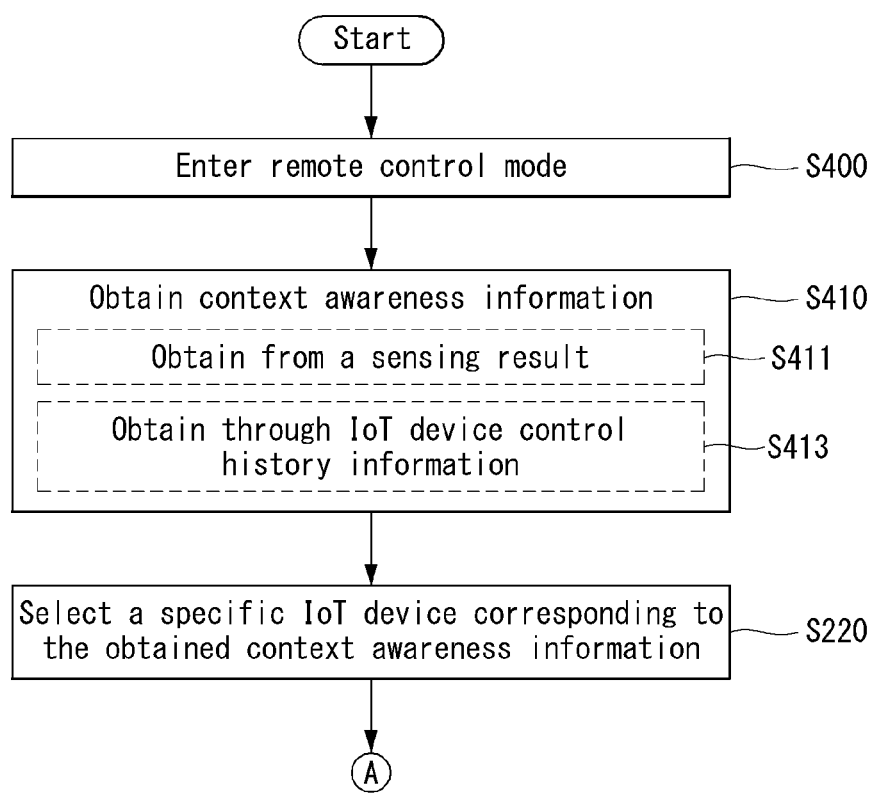
FIG. 13 is a flow diagram of a method for controlling a mobile terminal according to another embodiment of the present invention.

FIG. 13 is a flow diagram of a method for controlling a mobile terminal according to another embodiment of the present invention.

FIG. 13 illustrates a flow diagram of a method for controlling a mobile terminal which enters the remote control mode on the basis of context awareness information according to one embodiment of the present invention.

The controller 180 may control the mobile terminal to enter the remote control mode S400. A condition for the mobile terminal to enter the remote control mode is the same as described with reference to S100, S101, and S103 step of FIG. 3.

The controller 180 may obtain context awareness information S420 and select a specific IoT corresponding to the obtained context awareness information as an object to be controlled S420.

The controller 180 may obtain the context awareness information in various ways. For example, the controller may obtain context awareness information on the basis of a sensing result from environmental sensors installed in the mobile terminal 100, S411. The environmental sensors may include at least one of a temperature sensor, humidity sensor, light sensor, image sensor, or air quality measurement sensor.

A specific IoT device corresponding to the obtained context awareness information may be determined according to the type of sensing data. For example, when context awareness information is obtained through a light sensor, the specific IoT device may be an illumination device while, when context awareness information is obtained through a humidity sensor, the specific IoT device may be a humidifier.

Also, the controller 180 may recognize context information through control history information which provides a history of controlling an IoT device remotely by the user S413. The control history information may include at least one of date, time, object to be controlled, and the number of controls for the mobile terminal 100 to control an IoT device. When the control history information is employed, the controller 180 may still control the mobile terminal 100 to operate in the remote control mode even if the aforementioned grip state or attitude state does not satisfy the remote control triggering condition.

Meanwhile, the controller 180 may configure a specific IoT device corresponding to the obtained context awareness information as an object to be controlled. For example, if the temperature sensed by a temperature sensor is determined to be higher than a predetermined temperature while the grip state or attitude state of the body of the mobile terminal 100 satisfies a predetermined condition, the controller 180 may automatically recognize an air conditioner as an object to be controlled. Also, for example, if ambient light intensity sensed by a light sensor is determined to be darker than a predetermined brightness level while the grip state or attitude state of the body of the mobile terminal 100 satisfies a predetermined condition, the controller 180 may automatically recognize a lighting device as an object to be controlled.

Figure 14:
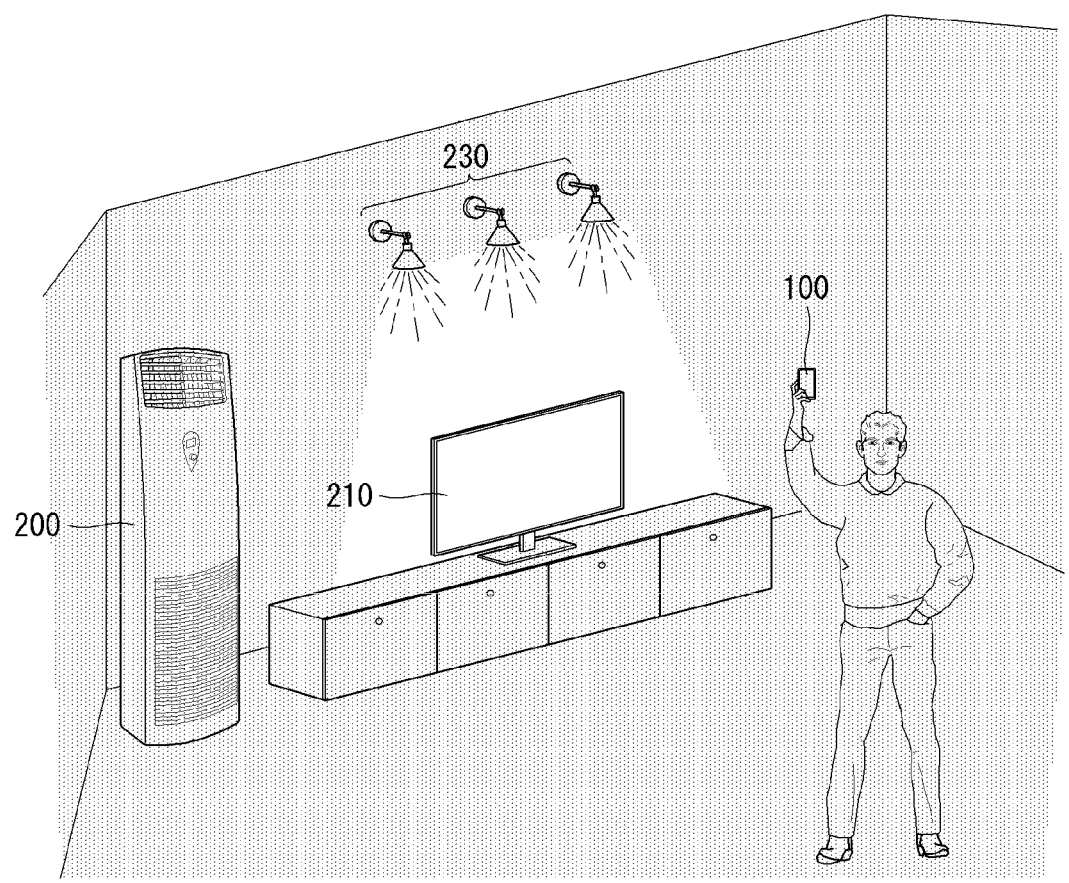
FIG. 14 illustrates an example of controlling a specific IoT device on the basis of context awareness information according to the embodiment of FIG. 13.

FIG. 14 illustrates an example of controlling a specific IoT device on the basis of context awareness information according to the embodiment of FIG. 13.

Referring to FIG. 14, while the user is holding a mobile terminal 100 in a predetermined grip type, the controller 180 may detect that the attitude of the mobile terminal 100 is maintained for a predetermined period of time so that the mobile terminal 100 is perpendicular to the ground. Also, when the controller 180 detects through a light sensor that ambient light intensity is below a predetermined light intensity, the controller 180 may control the mobile terminal to enter the remote control mode and provide, on the touch screen 151, a control menu for turning on a lighting device 230 in the remote control mode. Accordingly, the user may touch the control menu (power button) provided on the touch screen without seeing the mobile terminal 100 in the dark, thereby controlling the lighting device 230 to be turned on.

Figure 15:
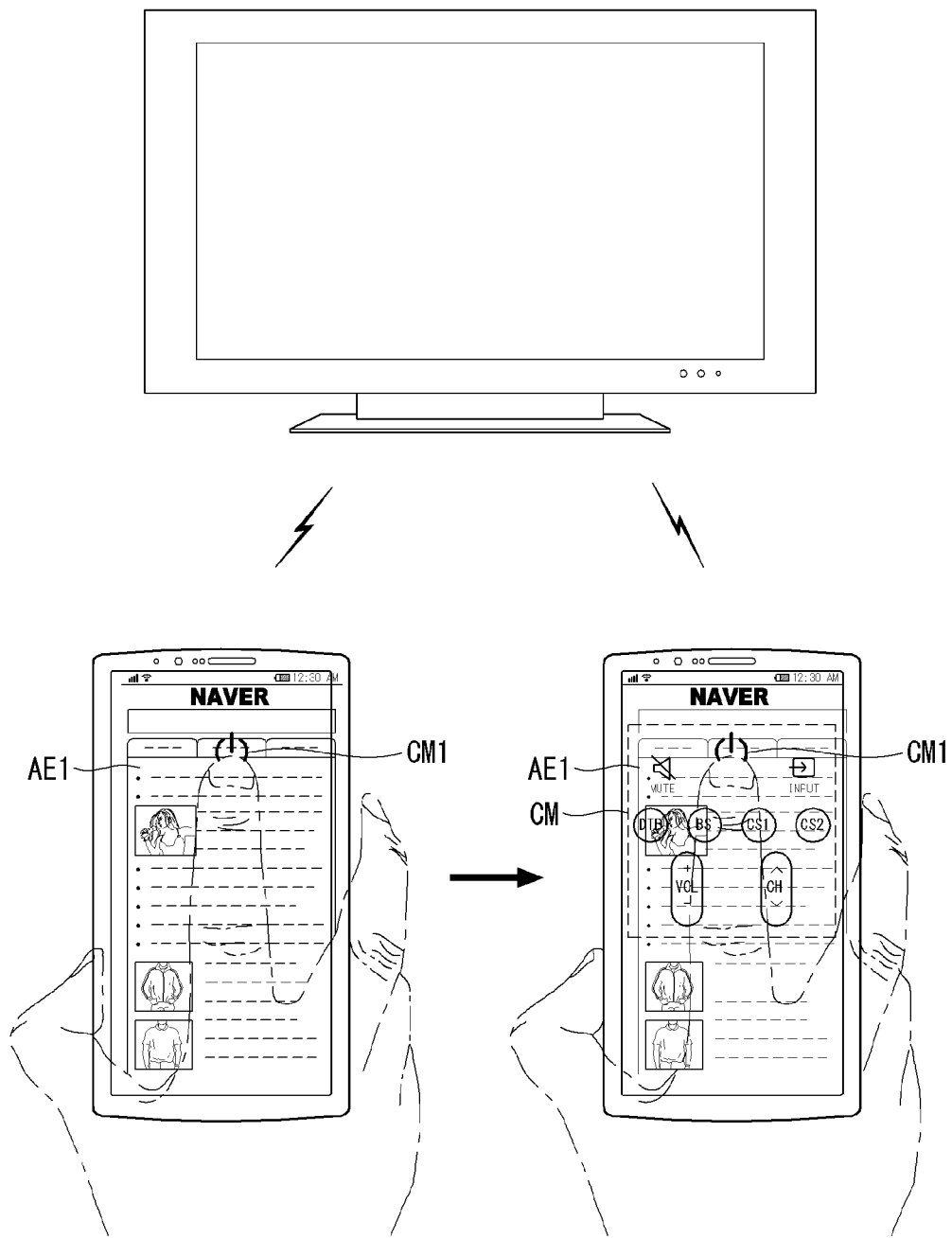
FIG. 15 illustrates an example of displaying a control menu when a mobile terminal enters a remote control mode while a specific application is running according to one embodiment of the present invention.

FIG. 15 illustrates an example of displaying a control menu when a mobile terminal enters a remote control mode while a specific application is running according to one embodiment of the present invention.

Referring to FIG. 15, while the execution screen AE1 of a specific application is displayed on the touch screen 151, the controller 180 may control the mobile terminal to enter the remote control mode. In this case, the controller 180 may provide an IoT device control menu at a touch point of the touch screen 151 in the form of a pop-up window. In other words, the execution screen AE1 of the specific application and the pop-up window may be displayed together. When the IoT device is turned off, the controller 180 may display a power button at the touch point and after the power button is touched, provide a control menu CM by which the entire functions of the IoT device may be controlled including the power button.

Figure 16:
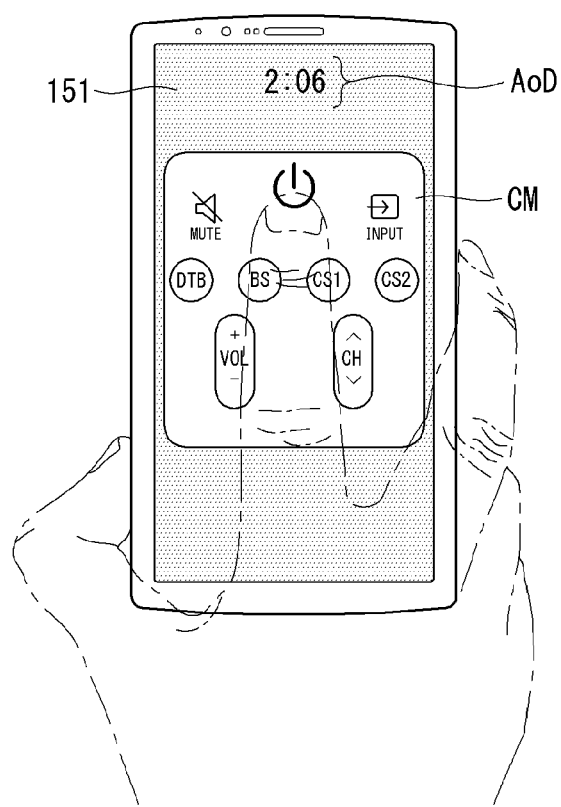
FIG. 16 illustrates an example of displaying a control menu in the Always on Display (AOD) state according to one embodiment of the present invention.

FIG. 16 illustrates an example of displaying a control menu in the Always on Display (AOD) state according to one embodiment of the present invention.

When the grip state or attitude state satisfies a predetermined condition while the touch screen 151 of the mobile terminal 100 is in the inactive state, namely in the AOD state, the controller 180 may display a control menu CM on the screen in the AOD state. The AOD information displayed in the AOD state may be displayed in an arbitrary area of the touch screen 151.

Up to this point, a process of operating the mobile terminal 100 in the remote control mode immediately when the mobile terminal 100 satisfies a predetermined condition without running a separate application for controlling an IoT device or without involving an additional process. However, the present invention is not limited to the specific process. For example, the present invention may include a case in which the mobile terminal 100 is controlled to operate in the remote control mode irrespective of the user's grip state or the attitude of the mobile terminal.

Figure 17:
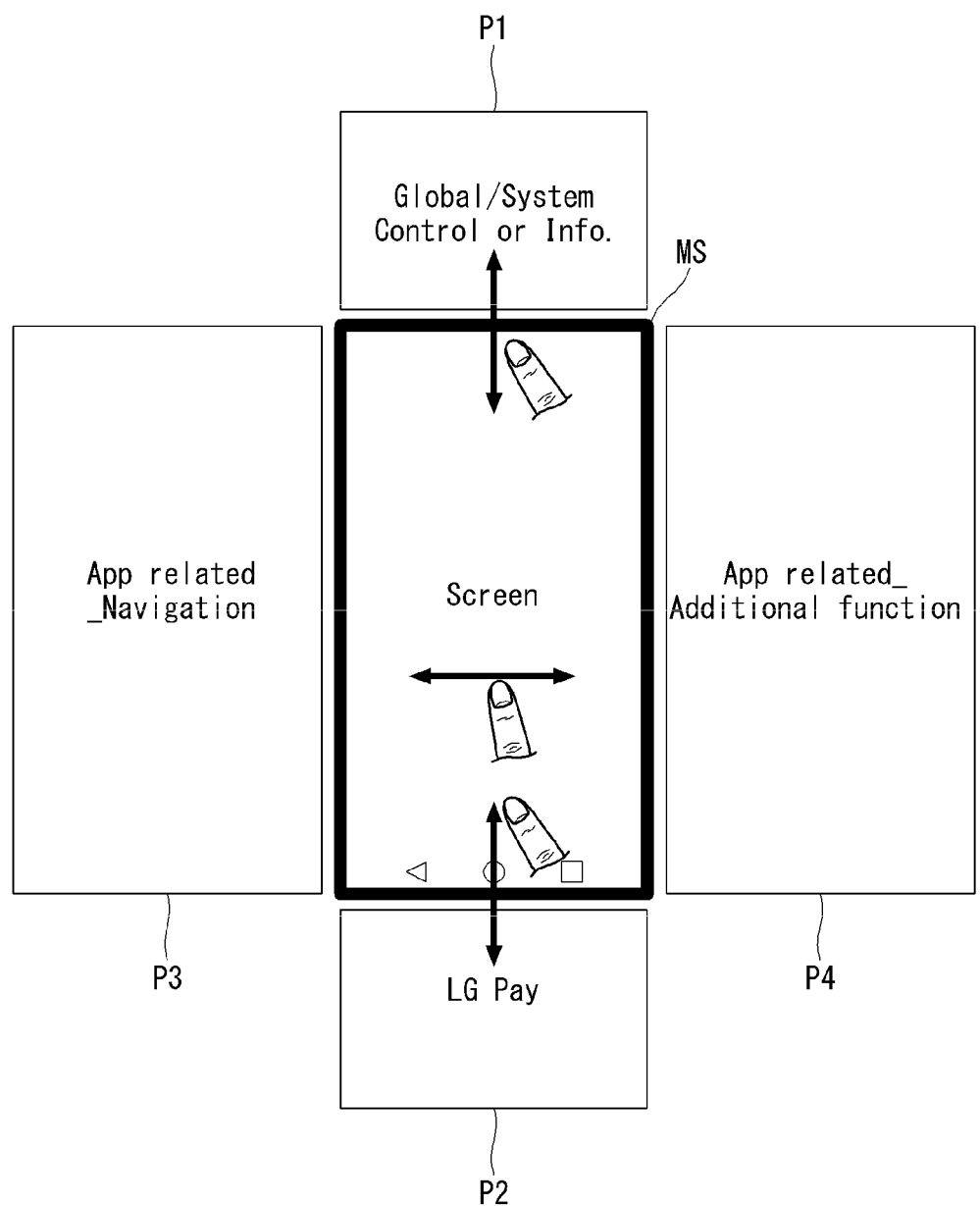
FIGS. 17 to 18 illustrates an example of providing an IoT control menu applied to a software platform operating a mobile terminal according to one embodiment of the present invention.
Figure 18:
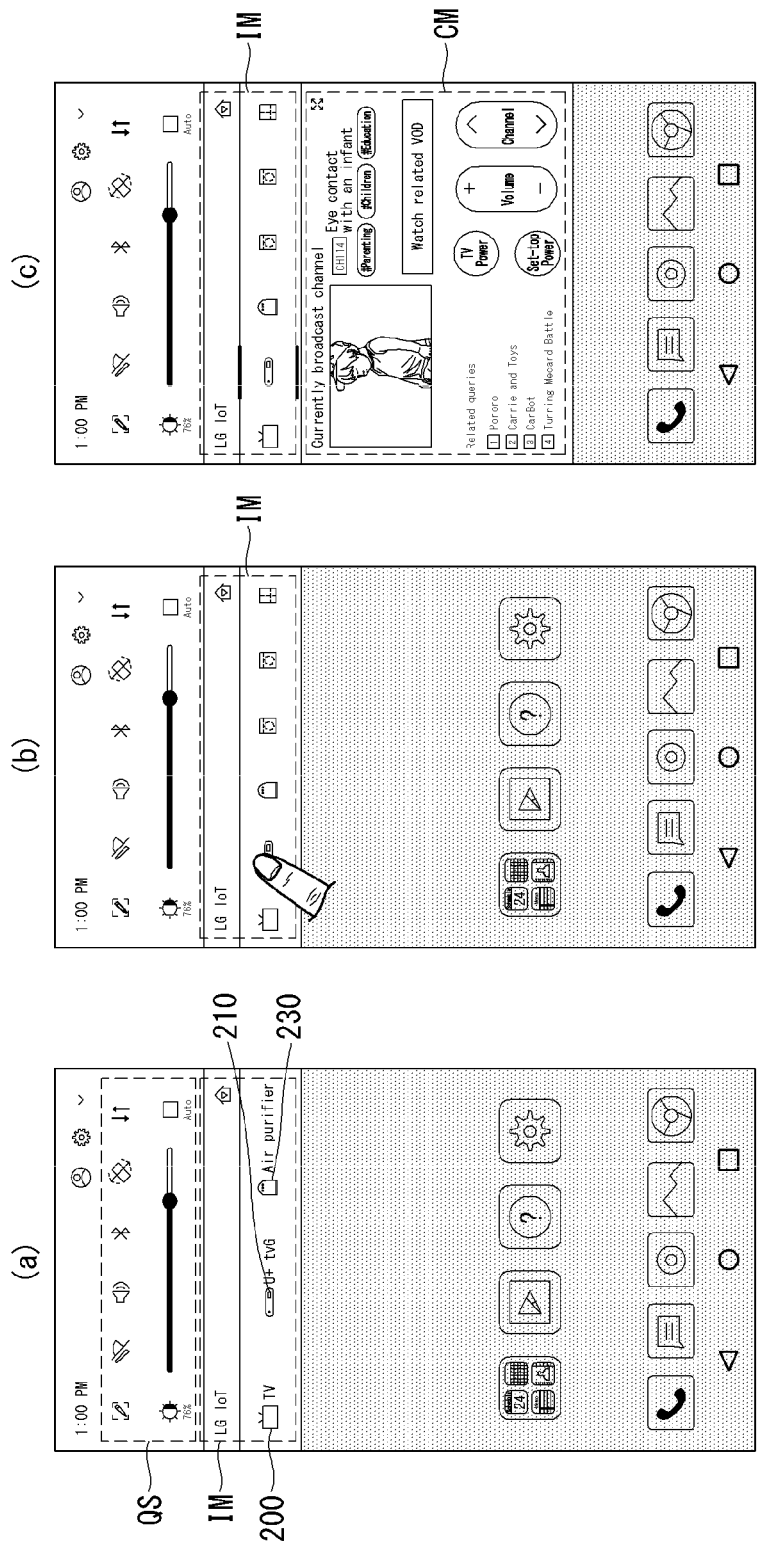

FIGS. 17 to 18 illustrates an example of providing an IoT control menu applied to a software platform operating a mobile terminal according to one embodiment of the present invention.

Referring to FIG. 17, the screen provided on the display unit 151 of the mobile terminal 100 according to one embodiment of the present invention may be classified largely into three categories according to a scroll input to the edge area of the touch screen. If a scroll input is received along the upper edge of the touch screen 151, an IoT device control menu P1 is slid to be provided together with a quick setting menu of the mobile terminal 100. Also, if a scroll input is received along the lower edge, a menu P2 related to a mobile payment application is slid to be provided. Also, if a scroll input is received along the side edge, a page related to a currently running application or a home screen page P3, P4 is made to be provided.

Referring to FIG. 18, if a scroll input is received in the downward direction from the upper edge while a home screen is displayed, a window including a quick setting menu QS of the mobile terminal 100 and an IoT device control menu IM may be slid to be provided. The IoT device control menu IM may display information about all of the devices connected to the current network. For example, when a total of three devices—for example, TV 200, tvG set-top box 210, and air purifier 230—are connected to a home network, icons related to the three devices may be included in the control menu.

Meanwhile, the number of devices included in the control menu IM may be increased in proportion to the number of devices connected to the network. If an input selecting the tvG set-top box icon 210 is received from the control menu IM, the controller 180 may increase the window size to provide a control menu CM by which the tvG set-top box 210 may be controlled in more detail.

Figure 19:
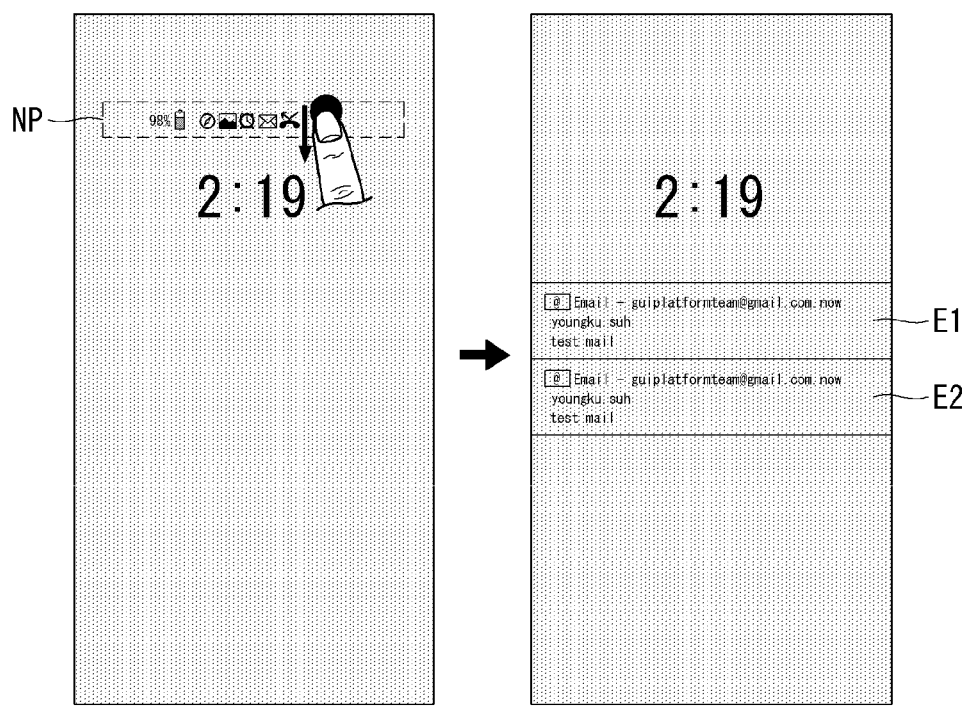
FIGS. 19 to 20 illustrates a method for displaying an IoT control menu in the AOD state according to one embodiment of the present invention.
Figure 20:
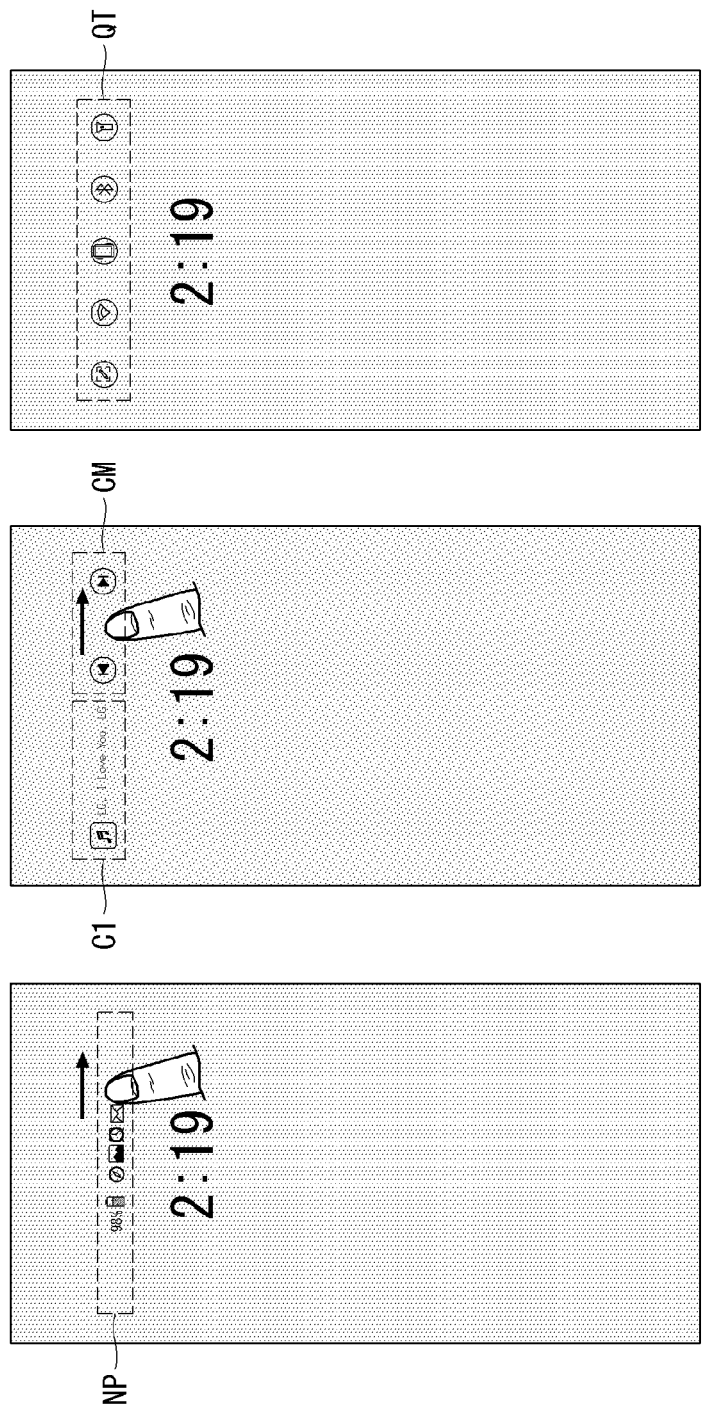

FIGS. 19 to 20 illustrates a method for displaying an IoT control menu in the AOD state according to one embodiment of the present invention.

Referring to FIG. 19, the controller 180 may provide various pieces of AOD information while being in the AOD state as described above. The AOD information may include a basic area for displaying date and time information (TI) and a notification area NP including state information of the mobile terminal 100 and an event icon notifying of an unidentified reception information. The controller 180 enables manipulation on the notification area NP while being in the AOD state.

For example, when an input swiping down the notification area NP is received in the presence of an unidentified reception event, information related to the event E1, E2 may be provided on the AOD screen. The information provided through a swiping input may correspond to preview information of a received event. If the preview information provided in the AOD state is selected to check the received event more specifically, the controller 180 may release the AOD state and activate the touch screen 151 to enter the execution screen of an application dealing with the corresponding event.

Referring to FIG. 20, the notification area NP provided in the AOD state may provide a control menu for controlling multimedia contents being played in the background and a control menu for controlling IoT devices in addition to the aforementioned mobile terminal state information and unidentified reception event information.

For example, when an input swiping the notification area NP to the right is received, the controller 180 may display the contents C1 being played in the background and a control menu CM for controlling the contents.

Also, when the input swiping the notification area NP to the right is received, the controller 180 may display a quick setting menu QT for changing the setting of the mobile terminal on the notification area NP.

As described above, when the mobile terminal 100 switches to the AOD state while the mobile terminal 100 controls an IoT device, the IoT device control menu may be provided through the notification area NP.

Meanwhile, though not shown in the figure, the information provided in the AOD state may be displayed by changing the position of the information on the AOD screen in real-time. Also, in the AOD state, an image may be displayed together in addition to text.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a body;
   a touchscreen coupled to a front side of the body;
   a first sensor coupled to an edge of the body and configured to sense an applied grip;
   a second sensor configured to detect attitude of the body;
   an input unit being located at a rear side of the body;
   a wireless communication unit configured to perform wireless communication with an external electronic device;
   a first camera and a second camera having a wider field of view than the first camera; and
   a controller configured to:
   cause the mobile terminal to enter a remote control mode, for remotely controlling the external electronic device, when an input from the first sensor indicates a grip state that satisfies a first defined condition, or when an input from the second sensor satisfies a second defined condition;
   after entering the remote control mode, control the external electronic device in response to a received input;
   capture a first image through the first camera that is in an Always on Camera (AOC) mode when the touchscreen is in an inactive state;
   capture a second image through the second camera, when only a part of the external electronic device is present in the first image;
   recognize the external electronic device in the captured second image; and
   display an extracted name corresponding to the external electronic device as being overlapped on a preview image.

2. The mobile terminal of claim 1, wherein the first defined condition comprises the applied grip being any of:
   gripping more than a predetermined region of a lower edge of the first sensor,
   gripping more than a predetermined region of a first side surface edge, or
   gripping more than a predetermined region of a second side surface edge, and wherein the controller is further configured to:
cause the mobile terminal to enter the remote control mode further when a touch input is received at the touchscreen for a period of time while the grip state continues to satisfy the first defined condition.

3. The mobile terminal of claim 1, wherein the first defined condition comprises the applied grip being any of:
gripping more than a predetermined region of a lower edge of the first sensor located along the edge of the body,
gripping more than a predetermined region of a first side surface edge, or
gripping more than a predetermined region of a second side surface edge, and
wherein the controller is further configured to:
cause the mobile terminal to enter the remote control mode further when a touch input is received at the input unit for a period of time while the grip state continues to satisfy the first defined condition.

4. The mobile terminal of claim 1, wherein the controller is further configured to:
cause the mobile terminal to enter the remote control mode further when an input from the second sensor indicates a change of the attitude of the body and the change in the attitude is maintained for a defined period of time.

5. The mobile terminal of claim 1, wherein the controller is further configured to:
cause the touchscreen to display a control menu for remotely controlling the external electronic device, according to a position of a touch input received at the touchscreen.

6. The mobile terminal of claim 5, wherein the controller is further configured to:
detect a power supply state of the external electronic device, the detected power supply state being one of a plurality of different states; and
configure the control menu according to which state, of the plurality of different states, the power supply state is detected.

7. The mobile terminal of claim 6, wherein the controller is further configured to:
cause the touchscreen to display a power button when the detected power supply state indicates that power has not been provided to the external electronic device; and
cause the touchscreen to display the control menu that includes the power button when the detected power supply state indicates that power has been provided to the external electronic device.

8. The mobile terminal of claim 1, wherein the controller is further configured to:
control the external electronic device in response to an input received at the input unit.

9. The mobile terminal of claim 8, wherein the controller is further configured to:
detect a power supply state of the external electronic device, the detected power supply state being one of a plurality of different states; and
control the external device according to which state, of the plurality of different states, the power supply state is detected.

10. The mobile terminal of claim 1, wherein the controller is further configured to:
obtain context awareness information; and
control a specific external electronic device corresponding to the obtained context awareness information, while in the remote control mode.

11. The mobile terminal of claim 10, further comprising:
a third sensor unit configured to sense an environment within which the mobile terminal is located, wherein the third sensor unit comprises at least one of a temperate sensor, a humidity sensor, a light sensor, an image sensor, or air quality measurement sensor, and wherein the controller is further configured to:
obtain the context awareness information based on an input received from the third sensor unit.

12. The mobile terminal of claim 10, wherein the context awareness information comprises a history of remote control of the external electronic device by the mobile terminal in the remote control mode.

13. The mobile terminal of claim 1, wherein the controller is further configured to:
cause the touchscreen to display a control menu for controlling the external electronic device as a pop-up window, after entering the remote control mode.

14. The mobile terminal of claim 1, wherein the external electronic device comprises at least one of a refrigerator, a washing machine, a TV, an air conditioner, an air purifier, a humidifier, a dehumidifier, a drier, a robot vacuum cleaner, a speaker, or a car.

15. The mobile terminal of claim 1, wherein the controller is further configured to:
cause the touchscreen to display a control menu for controlling the external electronic device while the external electronic device is in an inactive state, after entering the remote control mode from an Always on Display (AOD) mode in which the touchscreen is in an inactive state.

16. A method performed at a mobile terminal having a first camera and a second camera having a wider field of view than the first camera and a touchscreen to control an external electronic device, the method comprising:
causing the mobile terminal to enter a remote control mode, for remotely controlling the external electronic device via a network, when an input from a first sensor indicates a grip state that satisfies a first defined condition, or when an input from a second sensor satisfies a second defined condition as to attitude of the mobile terminal;
entering the remote control mode;
controlling the external electronic device in response to an input received at the mobile terminal,
capturing a first image through the first camera that is in an Always on Camera (AOC) mode when the touchscreen is in an inactive state;
capturing a second image through the second camera, when only a part of the external electronic device is present in the first image;
recognizing the external electronic device in the captured second image; and
displaying an extracted name corresponding to the external electronic device as being overlapped on a preview image.

17. A mobile terminal, comprising:
a body;
a touchscreen coupled to the body;
a first sensor coupled to the body and configured to measure an applied grip;
a second sensor configured to detect attitude of the body;
a wireless communication unit configured to perform wireless communication with an external electronic device;
a first camera and a second camera having a wider field of view than the first camera; and a controller configured to:

cause the mobile terminal to enter a remote control mode, for remotely controlling the external electronic device, when measurement from the first sensor indicates a first defined condition or when an input from the second sensor indicates a second defined condition; and control the external electronic device in response to a received input, after entering the remote control mode;

capture an image through the first camera that is in an Always on Camera (AOC) mode when the touchscreen is in an inactive state;

capture a second image through the second camera that is in an Always on Camera (AOC) mode when only a part of the external electronic device is present in the first image;

recognize the external electronic device in the captured second image; and display an extracted name corresponding to the external electronic device as being overlapped on a preview image.

* * * * *